(12) United States Patent
Minas

(10) Patent No.: US 12,078,108 B2
(45) Date of Patent: Sep. 3, 2024

(54) HYDROGEN AIRCRAFT WITH CRYO-COMPRESSED STORAGE

(71) Applicant: General Electric Company, Schenectady, NY (US)

(72) Inventor: Constantinos Minas, Niskayuna, NY (US)

(73) Assignee: GENERAL ELECTRIC COMPANY, Cincinnati, OH (US)

( * ) Notice: Subject to any disclaimer, the term of this patent is extended or adjusted under 35 U.S.C. 154(b) by 175 days.

(21) Appl. No.: 17/830,105

(22) Filed: Jun. 1, 2022

(65) Prior Publication Data

US 2023/0392551 A1    Dec. 7, 2023

(51) Int. Cl.
| | | |
|---|---|---|
| B64D 37/02 | (2006.01) | |
| B64D 37/30 | (2006.01) | |
| F02C 3/22 | (2006.01) | |
| F02C 7/224 | (2006.01) | |
| F02C 7/232 | (2006.01) | |
| F02C 9/28 | (2006.01) | |
| F02C 9/40 | (2006.01) | |

(52) U.S. Cl.
CPC .............. *F02C 7/224* (2013.01); *B64D 37/02* (2013.01); *B64D 37/30* (2013.01); *F02C 3/22* (2013.01); *F02C 7/232* (2013.01); *F02C 9/28* (2013.01); *F02C 9/40* (2013.01); *F05D 2220/323* (2013.01); *F05D 2260/213* (2013.01); *F05D 2260/231* (2013.01); *F05D 2260/60* (2013.01); *F05D 2270/301* (2013.01); *F05D 2300/121* (2013.01); *F05D 2300/603* (2013.01); *F17C 2221/033* (2013.01); *F17C 2223/0161* (2013.01); *F17C 2270/0189* (2013.01)

(58) Field of Classification Search
CPC .. F02C 7/224; F02C 3/22; F02C 7/232; F02C 9/28; F02C 9/40; B64D 37/02; B64D 47/30

See application file for complete search history.

(56) References Cited

U.S. PATENT DOCUMENTS

| | | |
|---|---|---|
| 4,821,907 A | 4/1989 | Castles et al. |
| 4,961,325 A | 10/1990 | Halvorson et al. |
| 5,582,016 A | 12/1996 | Gier et al. |
| 5,666,923 A | 9/1997 | Collier, Jr. et al. |
| 7,810,669 B2 | 10/2010 | Westenberger |
| 8,430,237 B2 | 4/2013 | Westenberger et al. |

(Continued)

FOREIGN PATENT DOCUMENTS

| | | |
|---|---|---|
| EP | 0787250 B1 | 4/2003 |
| KR | 101939983 B1 | 1/2019 |

OTHER PUBLICATIONS

European Patent Office, "Partial European Search Report," issued in connection with European Patent Application No. 23157098.7, dated Oct. 5, 2023, 14 pages.

*Primary Examiner* — Kevin R Barss

(74) *Attorney, Agent, or Firm* — HANLEY, FLIGHT & ZIMMERMAN, LLC

(57) ABSTRACT

Methods and apparatus are disclosed for a hydrogen aircraft with cryo-compressed storage. An example fuel distribution system includes a vacuum vessel, a cryogenic vessel positioned within the vacuum vessel, the cryogenic vessel part of a cryo-compressed hydrogen delivery assembly, and at least one of a heater or a thermosiphoning loop to maintain a pressure of the cryogenic vessel.

19 Claims, 10 Drawing Sheets

(56) References Cited

U.S. PATENT DOCUMENTS

| | | | |
|---|---|---|---|
| 9,982,843 B2 | 5/2018 | Kawai | |
| 10,082,246 B2 | 9/2018 | Aceves et al. | |
| 10,260,678 B2 | 4/2019 | Christ | |
| 2013/0299501 A1 | 11/2013 | Lee et al. | |
| 2014/0026597 A1 | 1/2014 | Epstein et al. | |
| 2014/0026598 A1 | 1/2014 | Trawicki et al. | |
| 2015/0362128 A1 | 12/2015 | Sanglan et al. | |
| 2017/0284725 A1* | 10/2017 | Wikus | G01R 33/3804 |
| 2020/0200326 A1* | 6/2020 | Aceves | F17C 3/08 |
| 2020/0240702 A1* | 7/2020 | Adachi | F25B 9/14 |
| 2021/0102492 A1 | 4/2021 | Rambo et al. | |
| 2021/0340908 A1 | 11/2021 | Boucher et al. | |

* cited by examiner

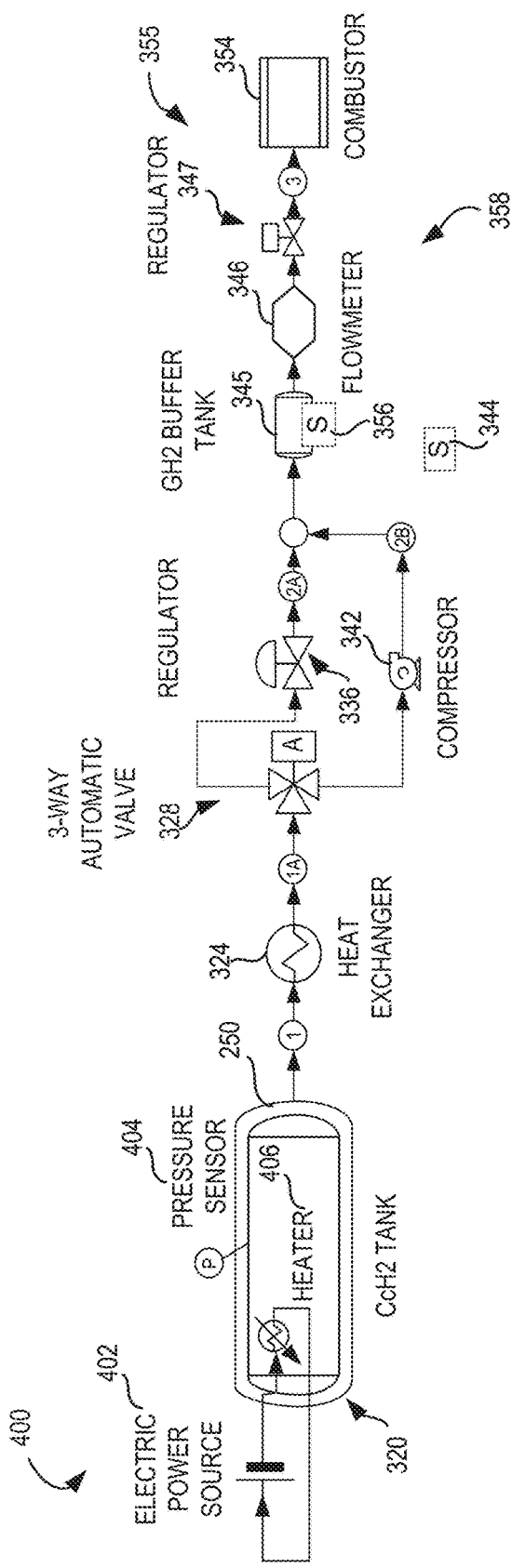
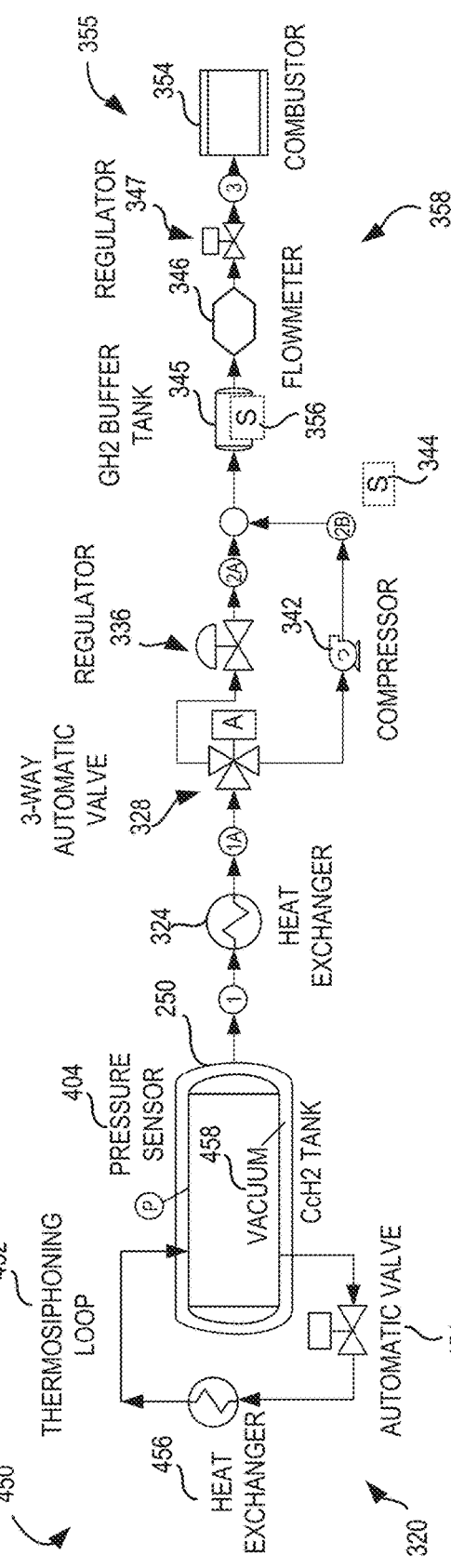
FIG. 4A
FIG. 4B

HYDROGEN AIRCRAFT WITH CRYO-COMPRESSED STORAGE

FIELD OF THE DISCLOSURE

This disclosure relates generally to fuel distribution systems, and, more particularly, to cryo-compressed storage.

BACKGROUND

Aircraft fuel distribution systems support fuel storage and fuel distribution to an engine. In some examples, a fuel system can include a single, gravity feed fuel tank with an associated fuel line connecting the tank to the aircraft engine. In some examples, multiple fuel tanks can be present as part of the fuel distribution system. The one or more tank(s) can be located in a wing, a fuselage, and/or in a tail of the aircraft. The tank(s) can be connected to internal fuel pump(s) with associated valve(s) and/or plumbing to permit feeding of the engine, refueling, defueling, individual tank isolation, and/or overall optimization of an aircraft's center of gravity.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which:

FIG. 4A schematically illustrates the fuel distribution pathway of FIG. 3B, including pressure maintenance using a heater.

FIG. 4B schematically illustrates the fuel distribution pathway of FIG. 3B, including pressure maintenance using thermosiphoning.

Figure 1A:
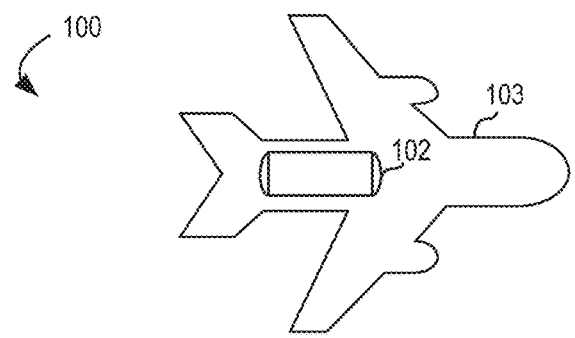
FIG. 1A illustrates an example positioning of a hydrogen-based fuel distribution system in an aircraft.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

DETAILED DESCRIPTION

Hydrogen-based systems can be used to power aircraft and/or turbines. For aircraft-based usage, hydrogen can be stored as pressurized gas or in liquid form. Liquid hydrogen (LH2) storage tanks are lighter than tanks filled with gaseous hydrogen (GH2) due to reduced tank volume needed to store liquid hydrogen versus gaseous hydrogen. Liquid hydrogen requires temperature regulation to minimize heat transfer and allow the liquid hydrogen to remain cold, avoiding the vaporization of the hydrogen over time. Aircraft fuel distribution systems using cryogenic fuel tanks (e.g., fuels requiring storage at extremely low temperatures to maintain them in a liquid state) generally include a supply tank and/or trailer, a flow control valve, a volumetric flowmeter, a cryogenic valve, a flexible vacuum jacketed flowline, and an onboard cryogenic fuel tank.

In addition to using liquid hydrogen, hydrogen-based fuel distribution systems can deliver gaseous hydrogen at required pressure(s) and/or flow rate(s) to a combustor to meet the transient performance requirements needed to assure that the engine meets both transient and cruise condition requirements. However, the fuel flow rate for an aircraft varies significantly during the flight mission. For example, a maximum fuel flow rate is used during takeoff, which is approximately four times the fuel flow rate at cruise altitude. Improved fuel distribution incorporating multiple fuel distribution systems to power an aircraft and/or turbine engine would permit increased engine efficiency. Additionally, various options for storing the hydrogen fuel can increase fuel distribution efficiency.

Methods and apparatus disclosed herein incorporate cryo-compressed hydrogen (CcH2), compressed natural gas (CNG), and/or gaseous hydrogen (GH2) storage. In some examples, a CNG tank can be used to help enable startup and operation with natural gas and/or a natural gas/hydrogen blend. In some examples disclosed herein, cryo-compressed hydrogen (CcH2) can be used in place of liquid hydrogen (LH2) fuel (e.g., CcH2 can have similar density as the LH2). As described herein, the cryo-compressed hydrogen (CcH2) can be stored in cryogenic temperatures in the range of 40-70 Kelvin. For example, a dual wall cryostat (e.g., including a cryo-vessel and a vacuum vessel) can be used to store the CcH2. In examples disclosed herein, the cryo-vessel can include a thicker wall than that of an equivalent LH2 cryo-vessel, given that CcH2 requires storage under higher pressures. In some examples, the cryo-vessel used for CcH2 storage can be a type-3 vessel including an aluminum liner and a composite overwrap. The vacuum vessel of both the LH2 cryostat and the CcH2 cryostat can be identical since such cryostats are designed for the same pressure of one atmosphere.

By storing hydrogen gas in cryo-compressed conditions as described herein, the fuel distribution system can be significantly simplified. For example, the usage of LH2 pumps can be eliminated given that CcH2 is already compressed. In some examples, hydrogen gas can be delivered to a combustor at a required pressure by pressure-driven flow, as described herein. For example, pressure in the CcH2 tank can be maintained at a constant value during an aircraft's operation by thermosiphoning and/or using a heater. In some examples, a hydrogen gas compressor can be used to deliver the remaining hydrogen gas to the combustor (e.g., when the storage pressure drops below a pressure required by the combustor). In some examples, the fuel distribution system disclosed herein includes a CcH2 tank, a set of hydrogen gas heat exchangers, a regulator, a buffer tank, a flowmeter and/or a second regulator (e.g., used to adjust the pressure to the combustor). In some examples, CNG can be blended with other hydrogen gas sources (e.g., a GH2 tank bank) to facilitate combustion initiation.

For the figures disclosed herein, identical numerals indicate the same elements throughout the figures. The example illustration of FIG. 1A is a diagram 100 representing positioning of a hydrogen-based fuel distribution system 102 on an aircraft 103. For example, the hydrogen-based fuel distribution system 102 can include a tank supplying liquid hydrogen and/or a tank bank supplying gaseous hydrogen to the hydrogen-based fuel distribution system 102, as described in connection with FIGS. 1B and/or 1C. Although the aircraft 103 shown in FIG. 1A is an airplane, the examples described herein may also be applicable to other fixed-wing aircraft, including unmanned aerial vehicles (UAV), and/or any type of non-aircraft-based application (e.g., watercraft, road-base vehicles, trains, etc.). The hydrogen-based fuel distribution system 102 can be used to provide hydrogen fuel that will be combusted in a gas turbine engine of the aircraft 103. However, the example implementations of the fuel tank(s) described herein may also be applicable to other applications where hydrogen is used as a fuel in the aircraft 103. The examples described herein also may be applicable to engine(s) other than gas turbine engines. While the gas turbine engine is an example of a power generator for powering the aircraft 103 using hydrogen as a fuel, hydrogen may also be used as a fuel for other power generators. For example, a power generator may be a fuel cell (hydrogen fuel cell) where the hydrogen is provided to the fuel cell to generate electricity by reacting with air.

Figure 1B:
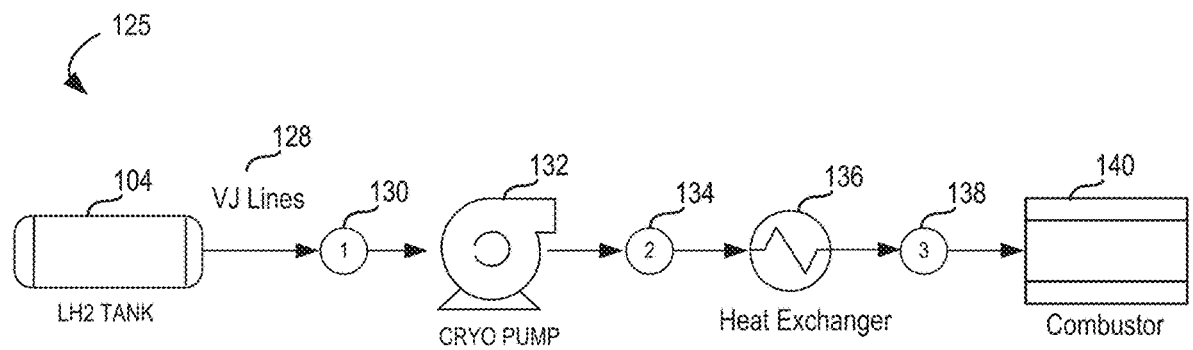
FIG. 1B schematically illustrates a known system for combustor start-up using a tank supplying liquid hydrogen to a hydrogen-based fuel distribution system.

FIG. 1B illustrates an example first known system 125 for combustor start-up using an example liquid hydrogen (LH2) tank 104 supplying liquid hydrogen to a hydrogen-based fuel distribution system (e.g., hydrogen-based fuel distribution system 102 of FIG. 1A). The first known system 125 for combustor start-up includes the LH2 fuel tank 104 for maintaining the hydrogen fuel in a liquid phase. For example, the LH2 fuel tank 104 may be configured to store the hydrogen fuel at a temperature of about −253° C. or less, and at a pressure greater than about one bar and less than about 10 bar, such as between about three bar and about five bar, or at other temperatures and pressures to maintain the hydrogen fuel substantially in the liquid phase. In the example of FIG. 1B, the combustor start-up components are connected in series by coupled vacuum jacketed (VJ) flowlines (e.g., VJ flowline(s) 128). In the example of FIG. 1B, flow control valve(s) 130, 134, 138 can be used to regulate the flow of LH2 from the LH2 tank 104. The flow control valve(s) 130, 134, 138 can be constructed to thermally insulate the cryogenic fuel during transmission so that the fluid does not heat up, vaporize, and/or leak out as a gas. In the example of FIG. 1B, the flow control valve 130 is connected to the LH2 fuel tank 104 by the VJ flowline(s) 128. In some examples, the flow control valve(s) 130, 134 operate at working temperatures lower than 233 K.

The combustor start-up components also include a cryogenic pump 132 and a heat exchanger 136 located downstream of the cryogenic pump 132. The cryogenic pump 132 can be configured to provide a flow of the hydrogen fuel in the liquid phase from the LH2 fuel tank 104 through the first known system 125 for combustor start-up. Operation of the cryogenic pump 132 can be increased or decreased to effectuate a change in a volume of the hydrogen fuel through the first known system 125 for combustor start-up. The cryogenic pump 132 may be any suitable pump configured to provide a flow of liquid hydrogen fuel. The heat exchanger 136 is located downstream of the cryogenic pump 132 and is configured to convert the hydrogen fuel from the liquid phase to a gaseous phase. For example, the heat exchanger 136 may be in thermal communication with the engine and/or an accessory system of the engine to provide the heat necessary to increase a temperature of the hydrogen fuel to change the hydrogen fuel from the liquid phase to the gaseous phase. The converted hydrogen fuel is then routed to an example engine combustor 140. A desired amount of fuel is provided to the engine combustor 140 using the flow control valve 138.

Figure 1C:
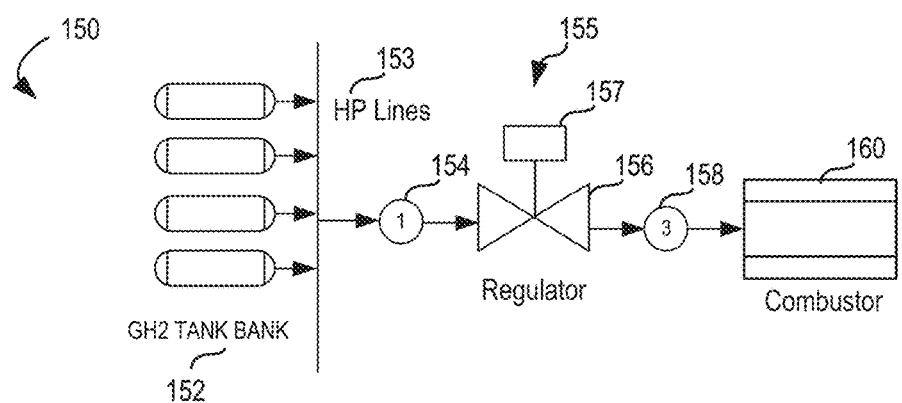
FIG. 1C schematically illustrates a known system for combustor start-up using a tank bank supplying gaseous hydrogen to a hydrogen-based fuel distribution system.

FIG. 1C illustrates an example second known system 150 for combustor start-up using an example gaseous hydrogen (GH2) tank bank 152 supplying gaseous hydrogen to a hydrogen-based fuel distribution system. In the example of FIG. 1C, the GH2 tank bank 152 can be configured to store hydrogen fuel in a gaseous phase. For example, the GH2 tank bank 152 may be configured to store the second portion of the hydrogen fuel at a temperature within about 50° C. of an ambient temperature, or between about −50° C. and about 100° C. In some examples, the GH2 tank bank 152 may be configured as a plurality of gaseous hydrogen fuel tanks to reduce an overall size and/or weight that would otherwise be needed to contain the desired volume of the hydrogen fuel in the gaseous phase at the desired pressures. In the example of FIG. 1C, the GH2 tank bank 152 is connected in series with a regulator 155 and a combustor 160. In the example of FIG. 1C, flow control valve(s) 154, 158 can be used to regulate the flow of GH2 from the GH2 tank bank 152. In the example of FIG. 1C, the flow control valve 154 is connected to the GH2 tank bank 152 by high-pressure (HP) flowline(s) 153 en route to the regulator 155. The regulator 155 can be a gaseous hydrogen delivery assembly flow regulator (GHDA flow regulator). The regulator 155 can be configured as an actively controlled variable throughput valve configured to provide a variable throughput ranging from 0% (e.g., a completely closed off position) to 100% (e.g., a completely open position), as well as a number of intermediate throughput values therebetween. In the example of FIG. 1C, the regulator 155 includes a valve portion 156 and an actuator 157. The actuator 157 is mechanically coupled to the valve portion 156 to provide the variable throughput therethrough. In the example of FIG. 1C, the hydrogen fuel in a gaseous phase is transferred to the combustor 160 via the flow control valve 158.

Figure 2A:
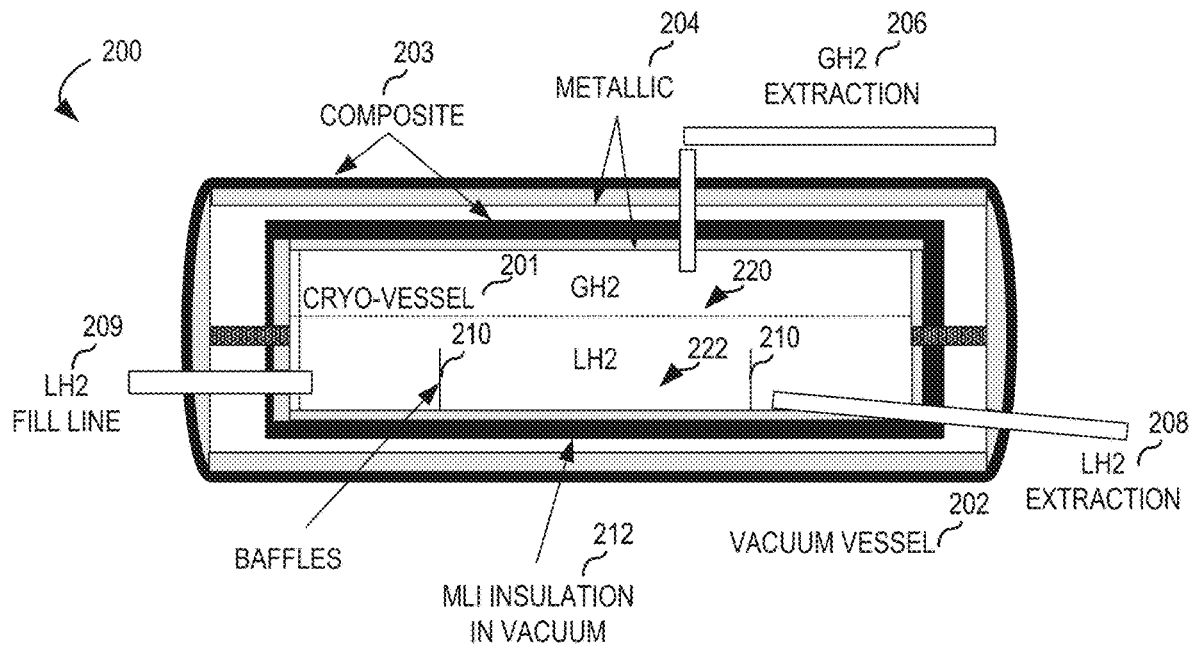
FIG. 2A schematically illustrates an example known storage tank for liquid hydrogen (LH2) storage.

FIG. 2A schematically illustrates an example known storage tank 200 for liquid hydrogen (LH2) storage. While in the examples of FIGS. 1B and 1C hydrogen fuel storage is limited to an LH2 fuel tank 104 and/or a GH2 tank bank 152, storing hydrogen in a cryo-compressed state can provide several advantages, including diversifying the hydrogen fuel distribution pathway(s) and modifying the weight and/or volume of the storage and fuel distribution system(s). The known storage tank 200 of FIG. 2A is a dual wall cryostat including an example cryo-vessel 201 and an example vacuum vessel 202. In the example of FIG. 2A, the dual wall cryostat includes a composite overwrap 203 and/or a metallic (e.g., aluminum) liner 204. The cryo-vessel 201 includes a first section 220 containing gaseous hydrogen (GH2) and a second section 222 including liquid hydrogen (LH2). As such, the storage tank 200 of FIG. 2A can be used for GH2 extraction (e.g., using a GH2 extraction pipe 206) and/or for LH2 extraction (e.g., using a LH2 extraction pipe 208). In some examples, an LH2 fill line pipe 209 can be used to fill the cryo-vessel with liquid hydrogen (e.g., the second section 222 including liquid hydrogen (LH2)). In the example of FIG. 2A, the second section 222 of the cryo-vessel including liquid hydrogen (LH2) contains baffle(s) 210 used to avoid liquid sloshing in the storage tank 200. In some examples, the baffle(s) 210 are positioned vertically to mitigate strong shaking of the liquid. In some examples, the vacuum vessel 202 includes multilayer insulation (MLI) 212. For example, the MLI 212 can provide required thermal performance given that such insulation can minimize heat transfer.

Figure 2B:
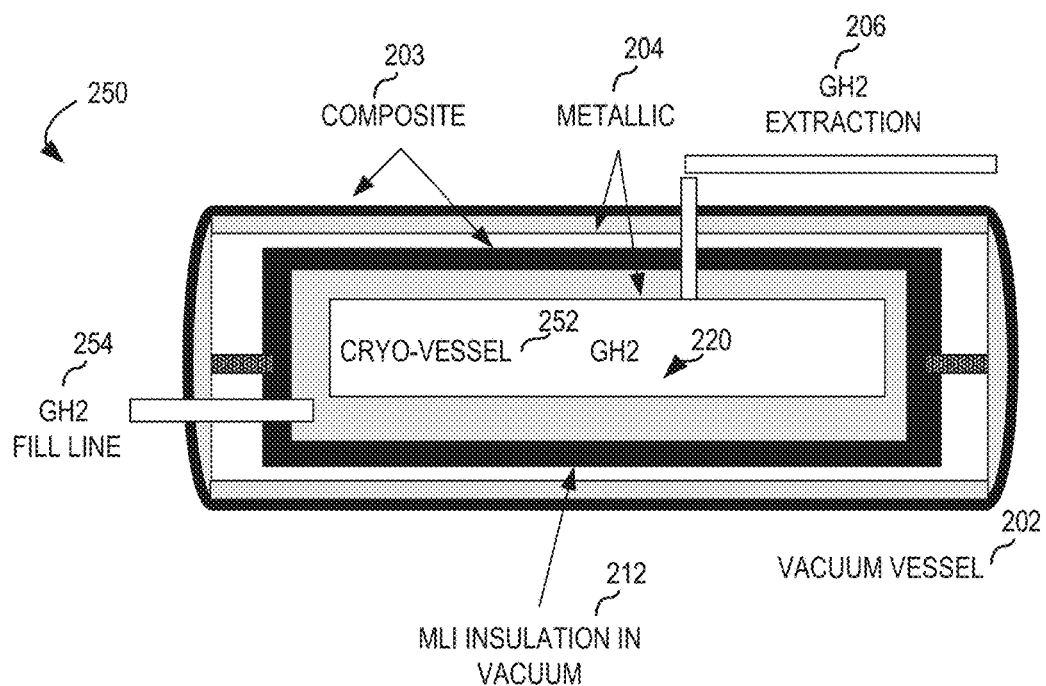
FIG. 2B schematically illustrates an improved cryo-compressed hydrogen (CcH2) storage tank disclosed herein.

FIG. 2B schematically illustrates an improved cryo-compressed hydrogen (CcH2) storage tank 250 disclosed herein. For example, the CcH2 storage tank 250 (e.g., used for GH2 fuel storage) can be used in place of the LH2 tank 104 of FIG. 1B, the GH2 tank bank 152, and/or the known storage tank 200 (e.g., given that CcH2 can have similar density as LH2). In the example of FIG. 2B, the CcH2 storage tank 250 includes the vacuum vessel 202 and a cryo-vessel 252. Unlike the cryo-vessel 201 of FIG. 2A, the cryo-vessel 252 includes thicker wall(s) to account for higher pressures at which cryo-compressed hydrogen (CcH2) is stored compared to liquid hydrogen (LH2). For example, while the thickness of the composite overwrap 203 and metallic liner 204 walls of the vacuum vessel 202 can remain the same, the thickness of the composite overwrap 203 and metallic liner 204 walls of the cryo-vessel 252 is significantly greater, as shown in the example of FIG. 2B. In some examples, the cryo-compressed hydrogen can be stored in cryogenic temperatures in a range of 40-70 Kelvin. In some examples, the cryo-vessel 252 used for CcH2 storage can be a type-3 vessel including a metallic liner 204 (e.g., an aluminum liner) and/or a composite overwrap 203. In some examples, the liner and overwrap can be made of the same type of material (e.g., metallic and/or composite). The vacuum vessel 202 of both the LH2 cryostat (e.g., part of the storage tank 200) and the CcH2 cryostat (e.g., part of the storage tank 250) can be identical since such cryostats are designed for the same pressure of one atmosphere. Unlike the storage tank 200, the storage tank 250 for CcH2 storage includes a GH2 fill line pipe 254 for adding the gaseous hydrogen to the cryo-vessel 252. The GH2 can be extracted from the cryo-vessel 252 using the GH2 extraction pipe 206.

As described in connection with FIG. 2B, the storage tank 250 can be used for the storage of cryo-compressed hydrogen (CcH2). While the density of liquid hydrogen is much higher than the density of compressed gaseous hydrogen, making storage of hydrogen in liquid form preferable to the storage of hydrogen in gaseous form, this can be mitigated by using cryo-compressed hydrogen, making cryo-compressed hydrogen an efficient fuel storage option. For example, cryo-compressed hydrogen gas can be stored at higher pressure(s) and regulated via valve-based pressure regulation based on a desired delivery pressure to the combustor, while liquid-based hydrogen can be stored at lower pressure(s) than the desired delivery pressure to the combustor and can include the use of a cryogenic pump for regulation of fluid flow. Additionally, as described in connection with FIGS. 4A, 4B, and/or the pressure in the storage tank 250 containing CcH2 can be maintained simply by changing the temperature of the cryogenic container (e.g., using a thermosiphoning loop and/or a heater, etc.). For example, cold hydrogen from the bottom of the storage tank 250 can be removed via the thermosiphoning loop, allowing the hydrogen to absorb heat before the hydrogen gas is returned to the storage tank 250 (e.g., via buoyancy-driven flow, etc.). However, as described in connection with FIG. 2B, the storage tank 250 requires thicker walls compared to the storage tank 200, given that known cryo-vessels (e.g., cryo-vessel 201) can be designed for lower pressure levels (e.g., 10 bar), while the cryo-vessel 252 of FIG. 2B can be designed to withstand higher pressure levels (e.g., 100 bar). Nevertheless, while the total weight of the storage tank 250 (e.g., for cryogenic hydrogen gas storage) can be significantly greater than the total weight of the known storage tank 200 (e.g., for cryogenic liquid hydrogen storage), removal of the cryogenic pump used for maintaining pressures in a liquid hydrogen-based flow distribution system can result in the elimination of up to 5,000 pounds (e.g., elimination of significant weight, simplification of the fuel distribution system, etc.). As such, the selection of a flow distribution system can depend on various factors, including vehicle storage capacity (e.g., a narrow-body aircraft versus a wide-body aircraft).

Figure 3A:
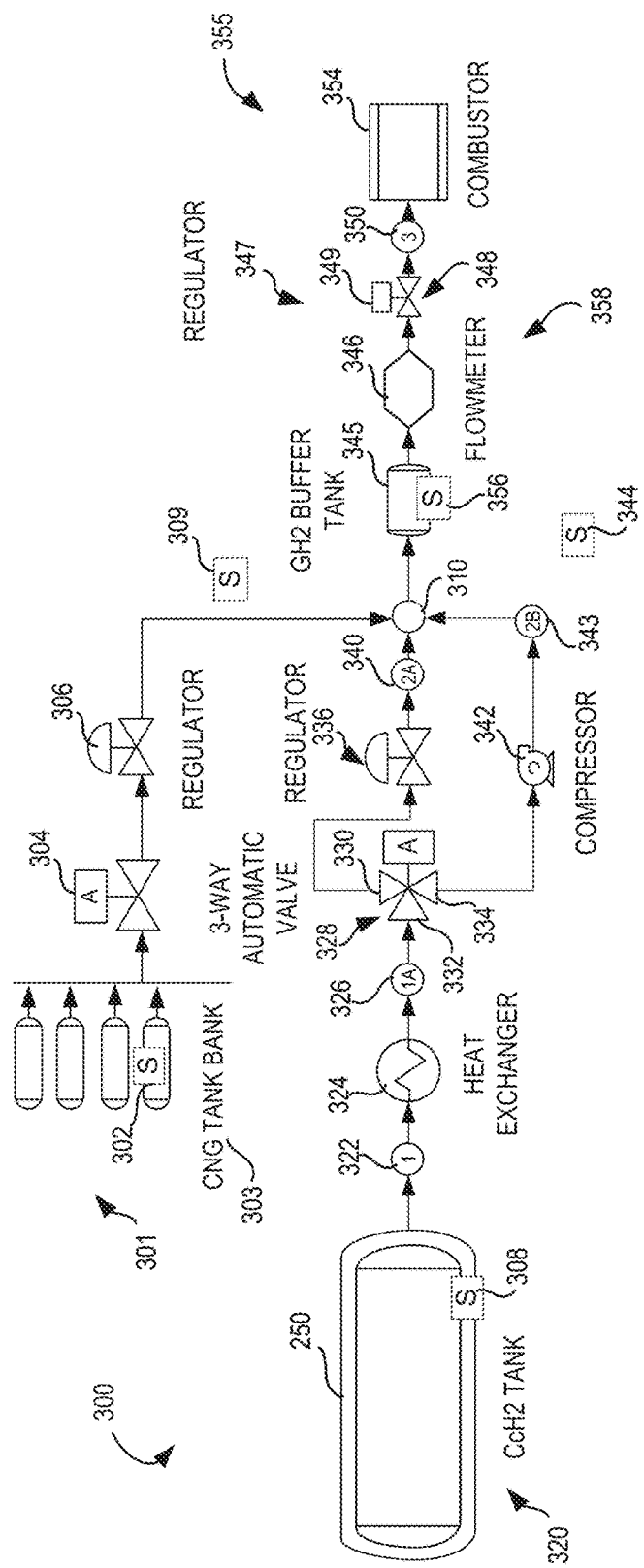
FIG. 3A schematically illustrates a first example fuel distribution arrangement using the cryo-compressed hydrogen (CcH2) storage tank of FIG. 2B, the fuel distribution arrangement including a compressed natural gas (CNG) tank bank.

FIG. 3A schematically illustrates a first example fuel distribution arrangement 300 using the cryo-compressed hydrogen (CcH2) storage tank 250 of FIG. 2B, the fuel distribution arrangement including a compressed natural gas (CNG) tank bank 303. In the example of FIG. 3A, the fuel distribution arrangement 300 includes a compressed natural gas delivery assembly 301 and a CcH2 delivery assembly 320. In some examples, the compressed natural gas delivery assembly 301 can be used for facilitating starting the engine of a vehicle, where the engine can include an aeronautical gas turbine engine and/or a turbofan engine, for example. In some examples, the CNG tank bank 303 and/or the CcH2 storage tank 250 arrangement can be used as a power supply and/or generator. Such an engine generally includes a combustion section having a combustor (e.g., combustor 354 of engine 355) with one or more fuel nozzles. However, the vehicle may be any other suitable land or aeronautical vehicle, and the engine may be any other suitable engine mounted to or within the vehicle in any suitable manner.

The example fuel distribution arrangement 300 of FIG. 3A includes the CNG tank bank 303 to hold natural gas and the CcH2 storage tank 250 to hold cryogenic hydrogen in a gaseous phase. For example, the CNG tank bank 303 can be used to introduce natural gas during engine startup without reliance on only liquid or gaseous hydrogen-based fuel. In some examples, a GH2 tank bank (not shown) can also be used to provide gaseous hydrogen during takeoff and climbing. For example, fuel consumption needs can vary based on a particular phase of the flight (e.g., taxing, takeoff, cruising, etc.). A relatively low hydrogen fuel flow rate is employed during the taxi operation, while the takeoff phase requires a relatively high hydrogen fuel flow rate (e.g., about 100% of a maximum hydrogen fuel flow rate for a given flight path). Meanwhile, the climb phase also requires a relatively high hydrogen fuel flow rate (e.g., between about 50% and 90% of the maximum hydrogen fuel flow rate). Cruising is the longest operation during the flight, with relatively low commanded hydrogen fuel flow (e.g., between about 25% and about 40% of the maximum hydrogen fuel flow rate). The highest fuel consumption occurs during cruise due to the duration of the cruise phase being the longest of the entire flight. During approach and landing operations, fuel flow rate is the lowest of the flight (e.g., less than about 20%, such as less than about 15% of the maximum hydrogen fuel flow rate). As such, using the CNG tank bank 303 and/or the CcH2 storage tank 250 arrangement shown in FIG. 3A permits the selection of a fuel distribution pathway based on a given operation being performed by the aircraft (e.g., taxing, takeoff, cruising, etc.) to match the necessary fuel flow rates and/or fuel availability (e.g., CcH2 can require heating, which can be more efficiently performed after the engine has been initiated, while CNG can be readily used during the initial engine start-up phase).

In the example of FIG. 3A, compressed natural gas flows from the CNG tank bank 303 to an automatic control valve 304, which includes an actuator and a valve portion. The actuator of the automatic control valve 304 is mechanically coupled to the valve portion of the automatic control valve 304 to provide the variable throughput therethrough. In some examples, the natural gas flows through a dynamically adjusted regulator 306. In the example of FIG. 3A, the dynamically adjusted regulator 306 is a pneumatic valve. The flow from the CNG tank bank 303 can be tracked by one or more sensor(s) for sensing various operability parameters of the fuel distribution arrangement 300 of FIG. 3A. For example, the fuel distribution arrangement 300 includes a first sensor 302 configured to sense data indicative of the CNG tank bank 303 and a second sensor 308 configured to sense data indicative of the CcH2 storage tank 250 (e.g., an internal temperature, an internal pressure, a temperature and/or pressure of gaseous and/or liquid fuel flowing from the fuel tank(s) 303, 250, etc.). The fuel distribution arrangement 300 of FIG. 3A also includes a third sensor 309 configured to sense data indicative of a flow of compressed natural gas from the CNG tank bank 303 (e.g., a temperature, a pressure, and/or a flow rate of gaseous hydrogen fuel at a location upstream of the RA flow regulator 347, at a location downstream of the RA flow regulator 347, or both), a fourth sensor 344 configured to sense data indicative of a flow of hydrogen fuel through the compressor 342 (e.g., a temperature, a pressure, and/or a flow rate of hydrogen fuel at a location upstream of the compressor 342, at a location downstream of the compressor 342, or both), and a fifth sensor 356 configured sense data indicative of a hydrogen fuel within the buffer tank 345 (e.g., a pressure, a temperature, and/or a mass of hydrogen fuel within an internal cavity of the buffer tank 345).

An example regulator assembly 358 is in fluid communication with the compressed natural gas delivery assembly 301 and/or the CcH2 delivery assembly 320 for providing hydrogen fuel to the engine 355, and, more specifically, to the combustor 354 of the engine 355. In the example of FIG. 3A, the regulator assembly 358 includes a buffer tank 345, a flowmeter 346, and a regulator assembly flow regulator 347 ("RA flow regulator 347"). The buffer tank 345 is configured to vary a mass flow rate of the hydrogen fuel from a fluid inlet to a fluid outlet during at least certain operations. In some examples, the buffer tank 345 can be configured to purge gaseous hydrogen fuel from within the buffer tank 345 through an exhaust valve when an internal pressure of the buffer tank 345 (e.g., a pressure within an internal cavity) exceeds an upper threshold. For example, the buffer tank 345 can accept hydrogen fuel (e.g., at a fluid inlet) at a greater flow rate than provided by the buffer tank 345 (e.g., at a fluid outlet) even when an internal pressure of the buffer tank 345 is at or exceeds an upper bound or upper threshold for the buffer tank 345 (e.g., more rapidly reduce a mass flowrate of hydrogen fuel to the combustor 354 of the engine 355). By virtue of its position within the regulator assembly 358, the buffer tank 345 is in fluid communication with the compressed natural gas delivery assembly 301 and/or the CcH2 delivery assembly 320. As such, the buffer tank 345 can be configured to receive hydrogen fuel from the compressed natural gas delivery assembly 301 (e.g., compressed natural gas) and/or the CcH2 delivery assembly 320 (e.g., hydrogen gas).

The flowmeter 346 of the regulator assembly 358 can sense data indicative of a mass flow rate of hydrogen fuel through the regulator assembly 358. For example, the flowmeter 346 can sense data indicative of one or more of a temperature of the gaseous hydrogen fuel flowing therethrough and a pressure of the gaseous hydrogen fuel flowing therethrough. In some examples, data from the flowmeter 346 can be utilized to control regulator assembly (RA) flow regulator 347 to ensure a desired amount of fuel is provided to the combustor 354 of the engine 355. The RA flow regulator 347 can be configured as an actively controlled variable throughput valve configured to provide a variable throughput ranging from 0% (e.g., a completely closed off position) to 100% (e.g., a completely open position), as well as a number of intermediate throughput values therebetween. For example, the RA flow regulator 347 includes a valve portion 348 and an actuator 349. The actuator 349 is mechanically coupled to the valve portion 348 to provide the variable throughput therethrough. In the example of FIG. 3A, the RA flow regulator 347 is in connection with the combustor 354 of the engine 355 via a flow control valve 350.

In the example of FIG. 3A, flow control valve 310 regulates compressed natural gas flow (e.g., originating from the CNG tank bank 303) and/or cryo-compressed hydrogen gas flow (e.g., originating from the CcH2 storage tank 250). For example, hydrogen gas exiting from the CcH2 storage tank 250 is directed to a heat exchanger 324 via a flow control valve 322. In some examples, the heat exchanger 324 can be in thermal communication with the engine 355, and, more specifically, with an accessory system of the engine 355 to provide the heat necessary to increase a temperature of the hydrogen fuel through the CcH2 delivery assembly 320. In the example of FIG. 3A, flow from the heat exchanger 324 is regulated using flow control valve 326 en route to a three-way automatic valve 328 defining an input 332, a first output 330, and a second output 334. In the example of FIG. 3A, the input 332 is in fluid communication with the CcH2 storage tank 250 for receiving a flow of the hydrogen fuel in the gaseous phase. The first output 330 is in fluid communication with a regulator 336 for regulating hydrogen flow to the regulator assembly 358 via the flow control valve(s) 310, 340. The second output 334 is in fluid communication with a compressor 342. For example, the three-way automatic valve 328 can be an active valve, such that an amount of gaseous hydrogen fuel provided to the first output 330, as compared to the amount of gaseous hydrogen fuel provided from the second output 334, from the input 332, can be actively controlled. In some examples, the three-way automatic valve 328 can be a passive valve. In the example of FIG. 3A, gaseous hydrogen fuel flow from the first output 330 is directed towards the regulator 336 (e.g., a dynamically adjusted regulator). In some examples, the regulator 336 is a pneumatic valve, through which the fuel flow passes en route to the regulator assembly 358. Gaseous hydrogen fuel flow from the second output 334 is directed towards the compressor 342, which can be used to compress the gaseous hydrogen to increase gas pressure prior to the fuel flow entering the regulator assembly 358 via a flow control valve 343.

Figure 3B:
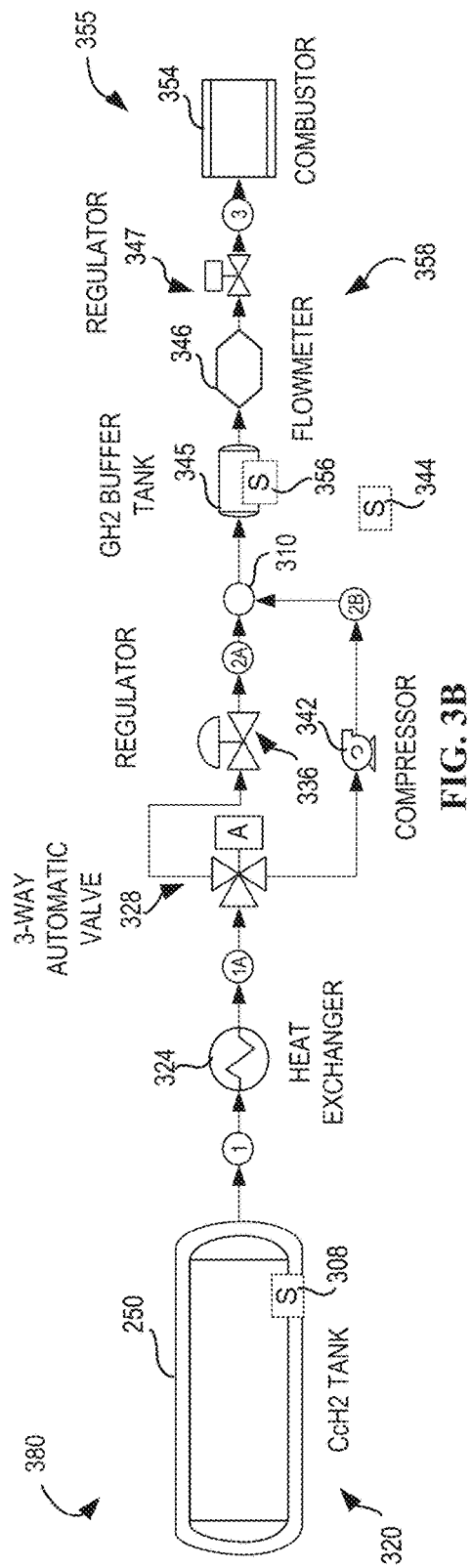
FIG. 3B schematically illustrates a second example fuel distribution arrangement using the cryo-compressed hydrogen (CcH2) storage tank of FIG. 2B.

FIG. 3B schematically illustrates a second example fuel distribution arrangement 380 using the cryo-compressed hydrogen (CcH2) storage tank 250 of FIG. 2B. In the example of FIG. 3B, the fuel distribution arrangement 380 is limited to the CcH2 delivery assembly 320 and does not include the compressed natural gas delivery assembly 301 of FIG. 3A. However, any type of fuel distribution arrangement can be used for hydrogen-based fuel delivery, including a fuel distribution arrangement with a CNG delivery assembly (e.g., CNG delivery assembly 301), a GH2 delivery assembly (not shown), and/or an LH2 delivery assembly (not shown) in combination with the CcH2 delivery assembly 320.

FIG. 4A schematically illustrates the fuel distribution arrangement 380 of FIG. 3B, including a first pressure maintenance method 400 using a heater. In the example of FIG. 4A, pressure in the CcH2 storage tank 250 (e.g., in the cryo-vessel 252 of FIG. 2B) can be maintained by introducing heat to warm the hydrogen gas using a heater. For example, over time, pressure in the cryo-vessel 252 can begin to drop, necessitating the introduction of heat to maintain the pressure within the vessel. In the example of FIG. 4A, an electric power source 402 can be used to power a heater 406 within the CcH2 delivery assembly 320. An example pressure sensor 404 can be used to monitor the pressure within the CcH2 storage tank 250 (e.g., in the cryo-vessel 252) to determine when the heater should be activated. While heating requires energy (e.g., electric power source 402), a second pressure maintenance method 450 illustrated in the example of FIG. 4B permits heating of the hydrogen gas via thermosiphoning, which does not require a power source (e.g., using natural convection). In some examples, the selection of the pressure maintenance method 400 and/or 450 can depend on the size of the delivery system and/or availability of ambient heat versus powered heating. In the example of FIG. 4B, the CcH2 storage tank 250 includes a cryo-vessel (e.g., cryo-vessel 252 of FIG. 2B) and a vacuum (e.g., vacuum 458). The thermosiphoning loop 452 of FIG. 4B includes an automatic valve 454 and/or a heat exchanger 456. For example, cold hydrogen can exit the CcH2 storage tank 250 via the automatic valve 454 and pass through the heat exchanger 456 on the way back to the CcH2 storage tank 250. For example, temperature of the hydrogen gas inside the CcH2 storage tank 250 can be slightly higher at the top of the cryo-vessel as opposed to the bottom of the cryo-vessel, causing hydrogen of higher density to settle to the bottom of the cryo-vessel, resulting in entry of this hydrogen gas into the thermosiphoning loop 452. As a result, the density of the hydrogen gas can be reduced as a result of heating, but a constant pressure can be maintained within the CcH2 storage tank 250. As the hydrogen gas is heated due to the temperature outside of the CcH2 storage tank 250 being higher than inside the CcH2 storage tank 250, the hydrogen gas becomes less dense and enter the top of the CcH2 storage tank 250. In the example of FIG. 4B, the pressure sensor 404 can be used to monitor the pressure of the cryo-vessel (e.g., cryo-vessel 252). In some examples, the compressor 342 can be used to continue maintaining a desired pressure when thermosiphoning does not produce a targeted pressure (e.g., due to the temperature of the hydrogen gas having reached ambient temperature outside of the CcH2 storage tank 250, etc.). In some examples, the first pressure maintenance method 400 (e.g., using the heater 406) and the second pressure maintenance method 450 (e.g., using the thermosiphoning loop 452) can be combined, as shown in connection with FIG. 5.

Figure 5:
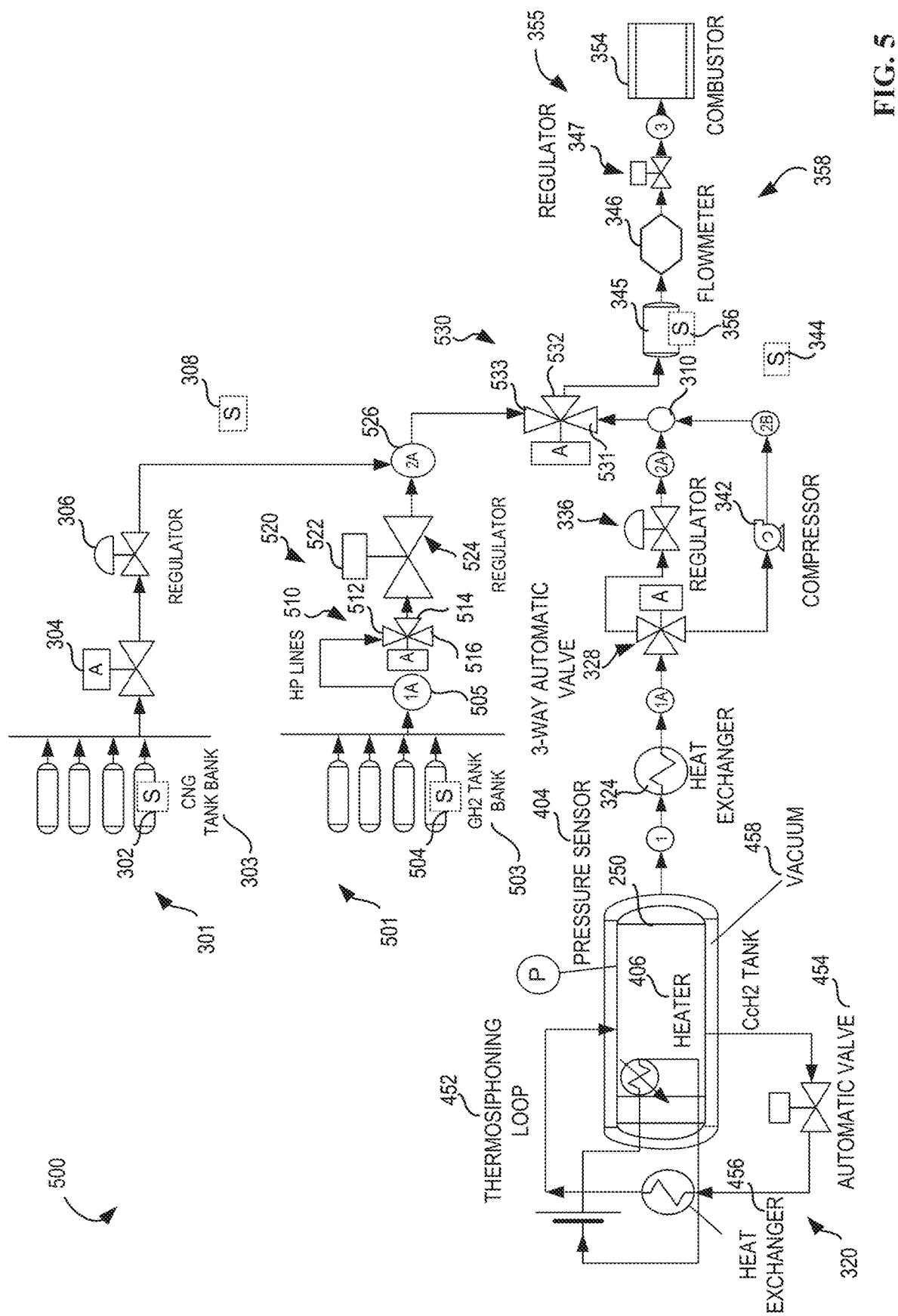
FIG. 5 schematically illustrates a fuel distribution arrangement using the cryo-compressed hydrogen (CcH2) storage tank of FIG. 2B, the fuel distribution arrangement including a compressed natural gas (CNG) tank bank and a gaseous hydrogen (GH2) tank bank, with pressure maintenance using a thermosiphoning loop and a heater.

FIG. 5 schematically illustrates a fuel distribution arrangement 500 using the cryo-compressed hydrogen (CcH2) storage tank 250 of FIG. 2B, the fuel distribution arrangement including the compressed natural gas (CNG) tank bank 303 and/or a gaseous hydrogen (GH2) tank bank 503, with pressure maintenance using the thermosiphoning loop 452 and a heater 406. In the example of FIG. 5, the fuel distribution arrangement 500 includes the compressed natural gas delivery assembly 301 (e.g., as described in connection with FIG. 3A), a gaseous hydrogen (GH2) delivery assembly 501, the CcH2 delivery assembly 320, and the regulator assembly 358. The GH2 delivery assembly 501 includes a GH2 tank bank 503 and a sensor 504 configured to sense data indicative of the GH2 tank bank 503. Gaseous hydrogen delivery can include the use of flow control valve(s) (e.g., flow control valve 505). Gaseous hydrogel delivery can also include a three-way boil-off valve 510 defining a first input 512, a second input 516, and an output 514. In the example of FIG. the first input 512 is in fluid communication with the GH2 tank bank 503 for receiving a flow of the first portion of hydrogen fuel in the gaseous phase from the GH2 tank bank 503. The three-way boil-off valve 510 can be configured to combine and/or alternate the flows from the first input 512 and the second input 516 to a single flow of gaseous hydrogen through the output 514. For example, the three-way boil-off valve 510 can be an active valve, such that an amount of gaseous hydrogen fuel provided from the first input 512, as compared to the amount of gaseous hydrogen fuel provided from the second input 516, to the output 514 can be actively controlled. In some examples, the three-way boil-off valve 510 can be a passive valve.

The GH2 delivery assembly 501 includes a gaseous hydrogen delivery assembly (GHDA) flow regulator 520. The GHDA flow regulator 520 can be configured as an actively controlled variable throughput valve configured to provide a variable throughput ranging from 0% (e.g., a completely closed off position) to 100% (e.g., a completely open position), as well as a number of intermediate throughput values therebetween. In FIG. 5, the GHDA flow regulator 520 includes a valve portion 524 and an actuator 522. The actuator 522 is mechanically coupled to the valve portion 524 to provide the variable throughput therethrough. Flow control valve 526 regulates gaseous hydrogen flow (e.g., originating from the GH2 tank bank 503) and compressed natural gas flow (e.g., originating from the CNG tank bank 303). The regulator assembly 358 is in fluid communication with the compressed natural gas delivery assembly 301, the GH2 delivery assembly 501, and/or the CcH2 delivery assembly 320 for providing hydrogen fuel to the engine 355, and, more specifically, to the combustor 354 of the engine 355.

In the example of FIG. 5, the regulator assembly 358 includes a three-way regulator valve 530. The three-way regulator valve 530 defines a first input 533, a second input 531, and an output 532. The first input 533 may be in fluid communication with the GH2 delivery assembly 501 and/or the compressed natural gas delivery assembly 301 to receive a flow of the compressed natural gas and/or the first portion of hydrogen fuel in the gaseous phase from the GH2 tank bank 503. The second input 531 is in fluid communication with the CcH2 delivery assembly 320 to receive a flow of the second portion of the hydrogen fuel in the gaseous phase from the CcH2 fuel storage tank 250. The three-way regulator valve 530 may be configured to combine and/or alternate the flows from the first input 533 and the second input 531 to a single flow of gaseous hydrogen through the output 532.

For the example shown in FIG. 5, the three-way regulator valve 530 is an active three-way regulator valve, including an actuator, such that an amount of hydrogen fuel provided from the first input 533, as compared to the amount of hydrogen fuel provided from the second input 531, to the output 532 may be actively controlled. In the example of FIG. 5, the second input 531 of the three-way regulator valve 530 receives hydrogen fuel originating from a CcH2 delivery assembly 320 which includes the CcH2 storage tank 250, the heat exchanger 324, and the three-way automatic valve 328 in connection with the regulator 336 and/or the compressor 342 downstream of the heat exchanger 324, as described in connection with FIG. 3A.

In the example of FIG. 5, the CcH2 storage tank 250 allows for pressure maintenance using a heater 406 and/or a thermosiphoning loop 452, as described in connection with FIGS. 4A and/or 4B. For example, the hydrogen gas can be heated via the thermosiphoning loop 452 when the gas can be heated using ambient temperature (e.g., temperature outside the CcH2 storage tank 250). Once the ambient temperature is reached (e.g., –40 degrees Celsius), increasing the temperature of the hydrogen gas originating from the CcH2 storage tank 250 can require the use of a heater (e.g., heater 406). In some examples, both heating methods can be engaged (e.g., thermosiphoning loop 452 in combination with heater 406) to accelerate the heating process as part of maintaining a constant gas pressure. In some examples, an initial start of the engine 355 can include the use of the CNG delivery assembly 301 to accelerate the engine 355 start-up process. Once the engine 355 is initiated, the heat exchanger(s) 324, 456 can receive heat from exhaust gases and/or from heated engine oil, allowing the use of the CcH2 delivery assembly 320. In some examples, the compressor 342 can be engaged to attain a desired pressure of the hydrogen gas within the CcH2 delivery assembly 320 as the gas travels en route to the regulator assembly 358 (e.g., which includes the combustor 354). In some examples, a designated pressure (e.g., 100 bar) can be maintained in the CcH2 delivery assembly 320, but the pressure can be adjusted using the compressor 342 if a pressure reduction (e.g., 70 bar) is needed for use by the combustor 354. In some examples, the combustor 354 can be engaged by the CcH2 delivery assembly 320 at initial stages of flight, while the thermosiphoning loop 452 and/or the heater 406 can be engaged at later stages. In some examples, the CcH2 storage tank 250 does not allow all the gas contained within the tank 250 to be used, such that at some point pressure in the storage tank 250 reaches a minimum pressure required by the combustor 354. As such, when, in a pressure-driven process, there is no more hydrogen gas to be extracted, temperature-based control can be used to extend and/or maintain a constant pressure for a prolonged period (e.g., using the heater 406).

Figure 6A:
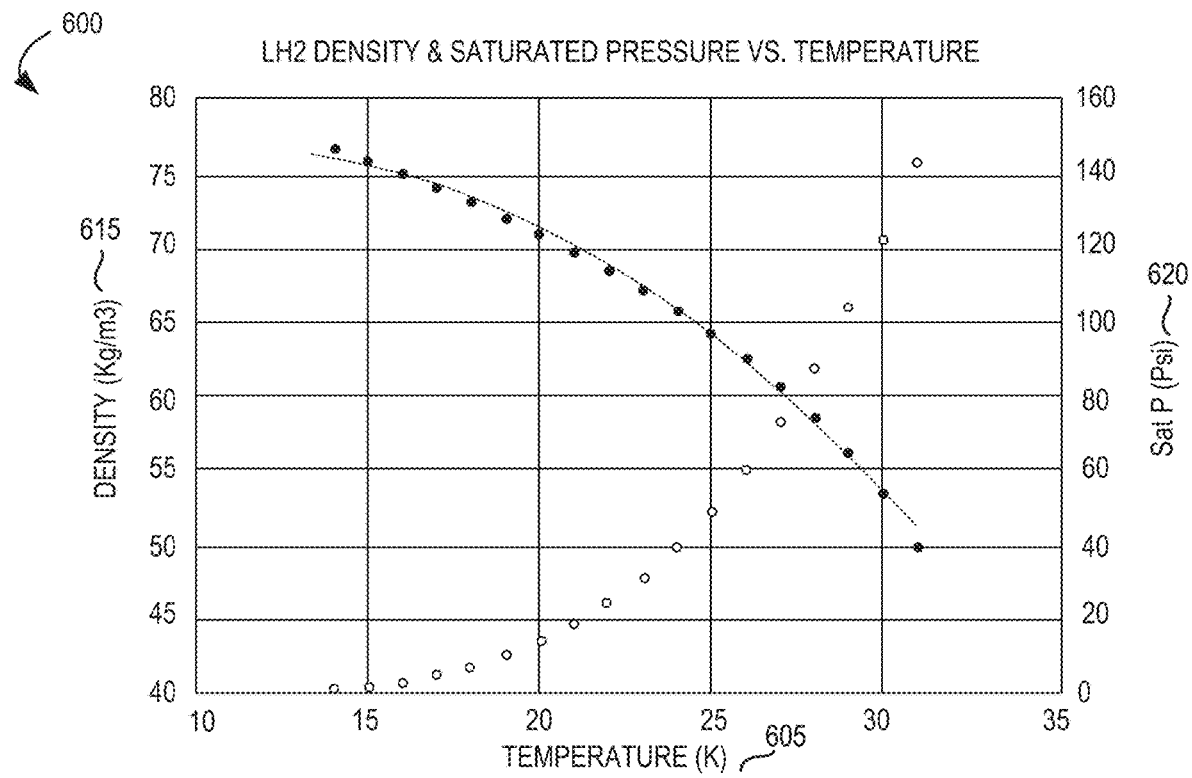
FIG. 6A illustrates example data associated with effects of temperature on liquid hydrogen (LH2) density and saturated pressure.

FIG. 6A is a graphical depiction of example data 600 associated with effects of temperature on liquid hydrogen (LH2) density and saturated pressure. As previously described, cryo-compressed hydrogen (CcH2) can have a density similar to that of liquid hydrogen (LH2). The density of LH2 as a function of temperature and the density of CcH2 as a function of pressure are shown in connection with FIGS. 6A and 6B. FIG. 6A includes a thermodynamic relationship of temperature 605 versus density 615 and temperature 605 versus saturated pressure 620 for liquid hydrogen (LH2). The thermodynamic properties of LH2 shown in FIG. 6A can be used to determine a target temperature and saturated pressure of LH2 refueled to the storage tank 200 of FIG. 2A. For example, as shown in connection with FIG. 6A, the density of LH2 at 25 Kelvin (K) is 64.2 kg/m$^3$. The same density can be achieved with CcH2 at the temperature of 40 Kelvin and a pressure of 100 bar, or at the temperature of 70 Kelvin and pressure of 300 bar. As such, CcH2 can be stored at cryogenic temperatures in the range of 40-70 Kelvin.

As previously described in connection with FIG. 2B, a dual wall cryostat can be used to contain the CcH2 (e.g., using the cryo-vessel 252 and the vacuum vessel 202). Since the CcH2 is stored under high pressure (e.g., as compared to liquid hydrogen storage), the cryo-vessel 252 will include a thicker wall than the equivalent LH2 cryo-vessel (e.g., the cryo-vessel 201). As previously described, the cryo-vessel 252 is a type-3 vessel with an aluminum liner and a composite overwrap, while the vacuum vessel 202 of both cryostats can be identical since both are designed for the same pressure of one atmosphere. As shown in FIGS. 2A and/or 2B, the vacuum vessel is a type-3 vessel with an aluminum line and a composite overwrap.

By storing hydrogen gas in a cryo-compressed condition, the fuel distribution system is simplified. For example, the LH2 pump can be eliminated since CcH2 is already compressed and the hydrogen can be delivered to the combustor 354 at the required pressure by pressure-driven flow, while the pressure in the CcH2 tank can be maintained constant for a majority of operation by thermosiphoning and/or heating, as described in connection with FIGS. 4A, 4B, and/or 5. Once the stored pressure drops below the combustor 354 required pressure, the compressor 342 can be used to deliver the remaining H2 to the combustor 354. Likewise, the compressor 342 can be used when the stored pressure in the cryo-vessel 252 drops below a pressure required for combustor 354 usage.

Figure 6B:
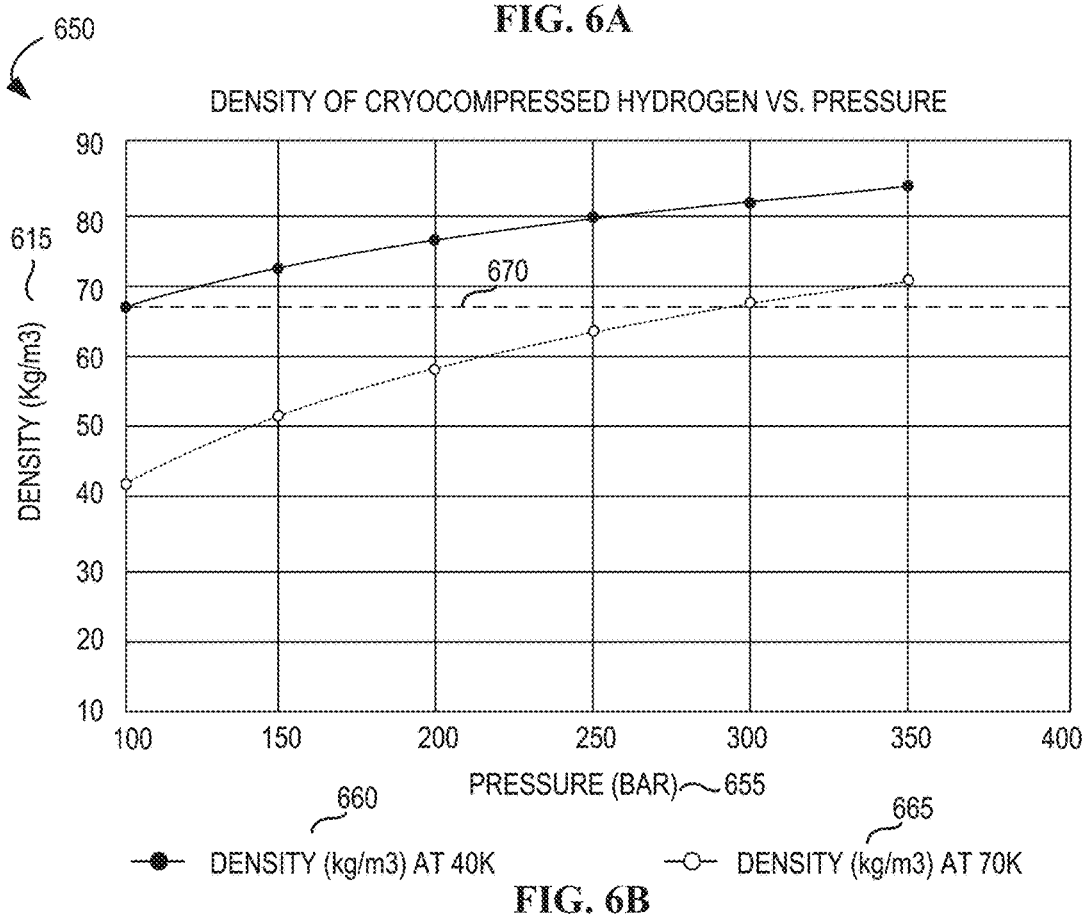
FIG. 6B illustrates example data associated with effects of pressure on a density of cryo-compressed hydrogen at various temperatures.

FIG. 6B is a graphical depiction of example data 650 associated with effects of pressure 655 on a density of cryo-compressed hydrogen (CcH2) at various temperatures, illustrating the thermodynamic properties of CcH2. The data 650 includes a first thermodynamic relationship 660 of CcH2 to represent density (kg/m$^3$) as a function of pressure (bar) at a temperature of 40 K and a second thermodynamic relationship 665 of CcH2 to represent density (kg/m$^3$) as a function of pressure (bar) at a temperature of 70 K. The data 650 also includes a reference line 670 to demonstrate the effect of temperature on the density of CcH2. For example, CcH2 at a temperature of 70 K and a pressure of 300 bar has a density of 63.7 kg/m$^3$, and CcH2 at 40 K and a pressure of 100 bar also has a density of 63.4 kg/m$^3$. For example, when the CcH2 fuel is refueled at 40 K, the CcH2 storage tank 250 has an internal volume of 20 m$^3$. Given an aircraft that relies on 1200 kg of CcH2 fuel for an intended flight, the CcH2 storage tank 250 can be designed with an internal pressure limit of 100 bar. When CcH2 fuel is refueled at 70 K with the same CcH2 storage tank 250 and the same amount of CcH2 fuel, then the CcH2 storage tank 250 can be designed with an internal pressure limit of 300 bar. In some examples, the CcH2 storage tank 250 includes more material (e.g., aluminum, steel, carbon fiber, etc.) to structurally facilitate containment of the potentially higher pressures.

Figure 7A:
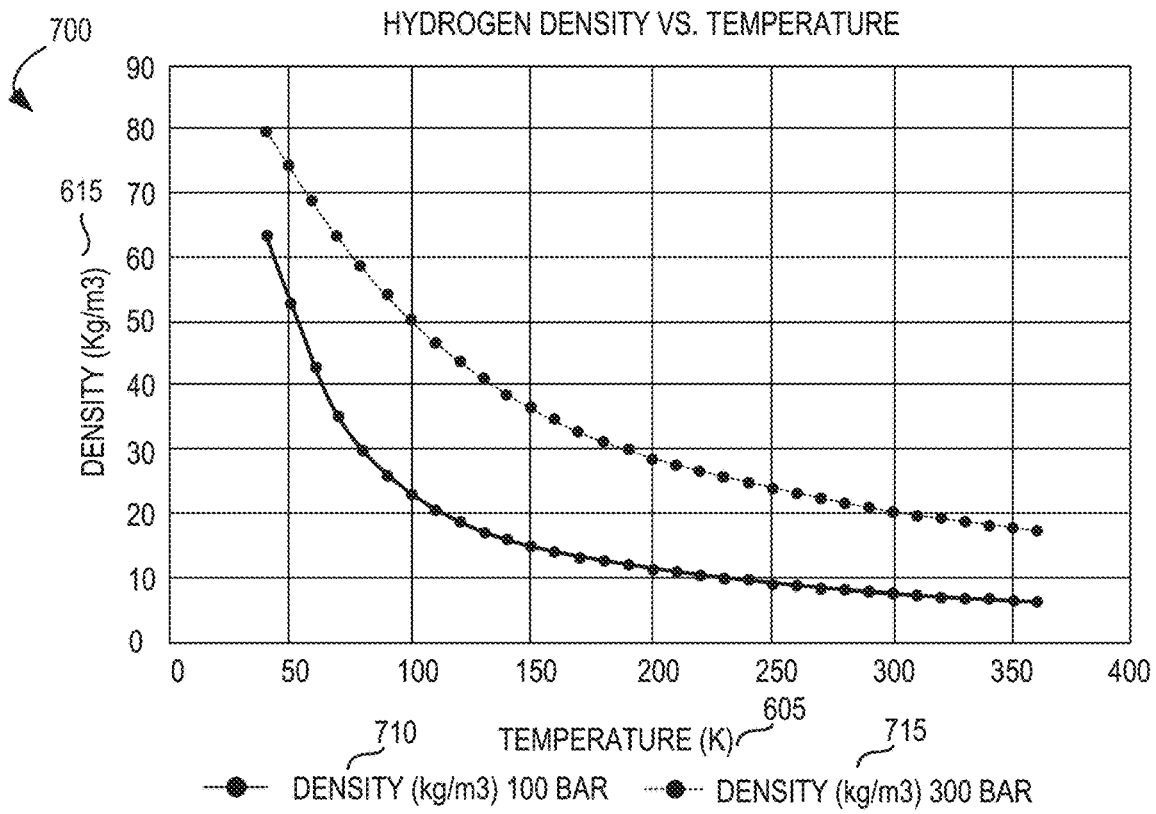
FIG. 7A illustrates example data associated with effects of temperature on hydrogen density at various pressures.
Figure 7B:
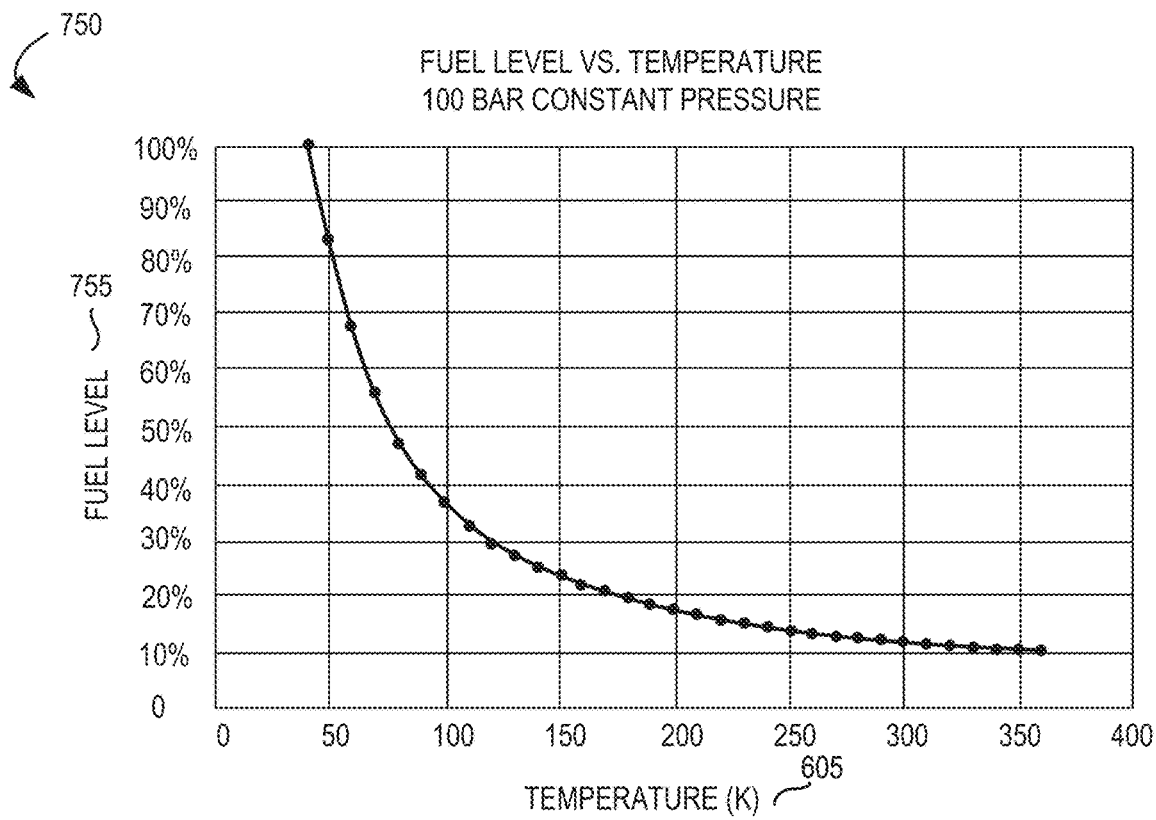
FIG. 7B illustrates example data associated with effects of temperature on a fuel level at a constant pressure.

FIG. 7A is a graphical depiction of example data 700 associated with effects of temperature 605 on hydrogen density 615 at various pressures (e.g., 100 bar, 300 bar). In the example of FIG. 7A, a given temperature can be used to determine the resulting density of the hydrogen. The data 700 includes a first thermodynamic relationship 710 to represent density (kg/m$^3$) as a function of temperature (K) at a pressure of 100 bar and a second thermodynamic relationship 715 to represent density (kg/m$^3$) as a function of temperature (K) at a pressure of 300 bar. In some examples, the first thermodynamic relationship 710 and/or the second thermodynamic relationship 715 can be used to determine the amount of heat needed to achieve a given hydrogen density (e.g., using the thermosiphoning loop 452 and/or the heater 406). FIG. 7B is a graphical depiction example data 750 associated with effects of temperature 605 on a fuel level 755 at a constant pressure (e.g., 100 bar). In the example of FIG. 7B, as the fuel is used by the aircraft, the pressure in the tank can remain the same by increasing the temperature of the hydrogen gas (e.g., using thermosiphoning or a heater).

Figure 8:
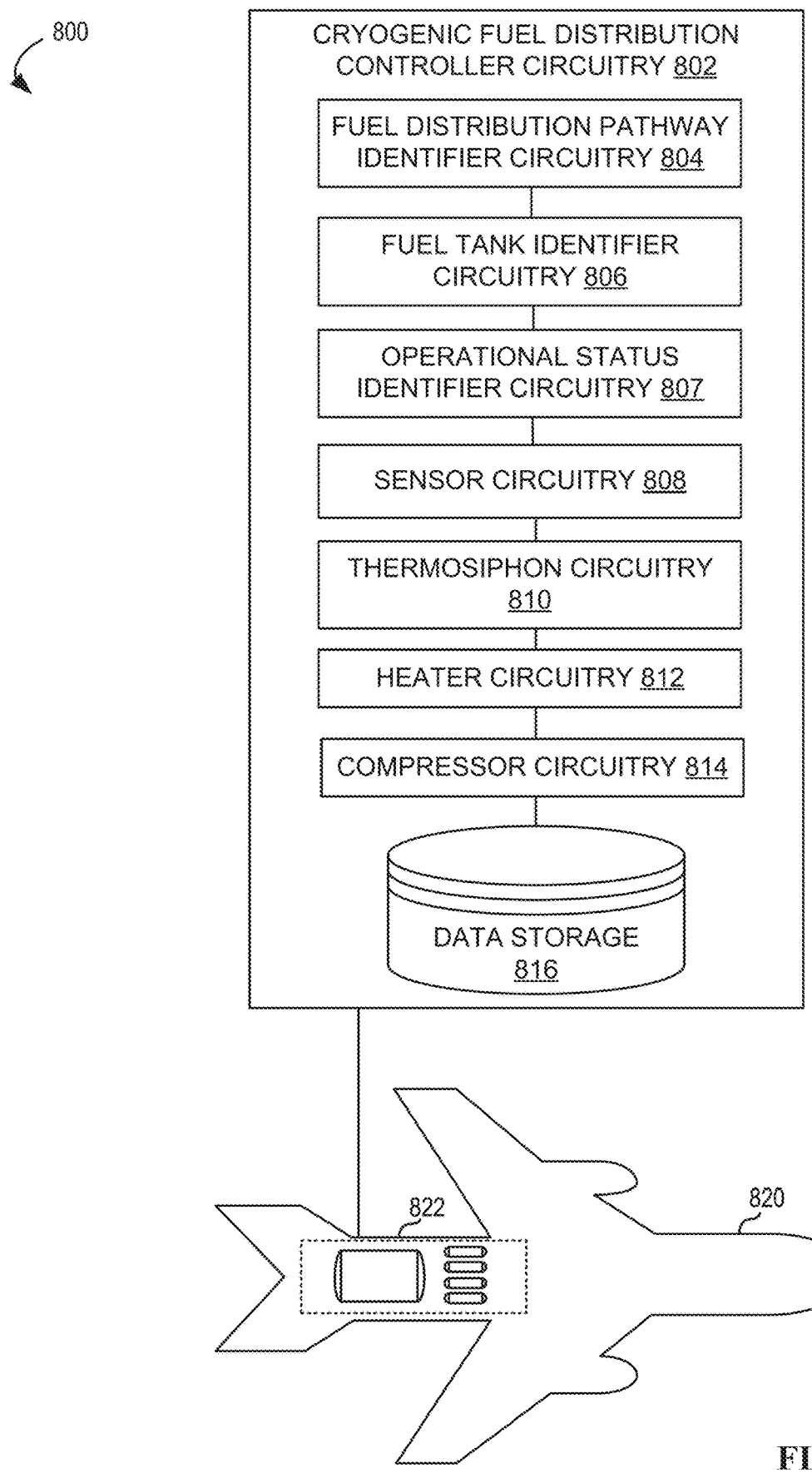
FIG. 8 is a block diagram of an example fuel distribution controller circuitry that may be incorporated into a fuel system developed in accordance with teachings of this disclosure.

FIG. 8 is a block diagram 800 of an example fuel distribution controller circuitry 802 that may be incorporated into a fuel system developed in accordance with teachings of this disclosure. In the example of FIG. 8, the fuel distribution controller circuitry 802 includes fuel distribution pathway identifier circuitry 804, fuel tank identifier circuitry 806, operational status identifier circuitry 807, sensor circuitry 808, thermosiphon circuitry 810, heater circuitry 812, compressor circuitry 814, and/or data storage 816. In the example of FIG. 8, the fuel distribution controller circuitry 802 is shown to be in communication with aircraft 820, which includes fuel storage component(s) 822. The fuel storage component(s) 822 can include any of the fuel storage systems described herein, including, but not limited to, the CcH2 storage tank 250 of FIG. 2B, the CNG tank bank 303 of FIG. 3A, and/or the GH2 tank bank 503 of FIG. 5.

The fuel distribution pathway identifier circuitry 804 identifies fuel distribution pathway(s) on the aircraft 820. For example, as shown in connection with FIGS. 3A, 3B, 4A, 4B, and 5, there are multiple fuel distribution pathways that can be positioned on the aircraft 820. In some examples, the fuel distribution systems can include a compressed natural gas delivery assembly (e.g., compressed natural gas delivery assembly 301), a gaseous hydrogen delivery assembly (e.g., the GH2 delivery assembly 501), and/or a cryo-compressed hydrogen delivery assembly (e.g., CcH2 delivery assembly 320). As such, the fuel distribution pathway identifier circuitry 804 can be used to identify whether the fuel delivery assemblies are operational.

The fuel tank identifier circuitry 806 identifies fuel tank(s) available on the aircraft 820 and/or the fuel tank status (e.g., fuel level(s)). In some examples, the fuel tank identifier circuitry 806 identifies the presence of a CNG tank bank, a GH2 tank bank, and/or a CcH2 tank onboard the aircraft 820. In some examples, the fuel tank identifier circuitry 806 identifies a specific fuel level (e.g., amount of gaseous hydrogen gas, amount of liquid hydrogen gas in a primary and/or a secondary tank, amount of compressed natural gas, etc.). Based on the identification(s) of the fuel tank identifier circuitry 806, the fuel distribution controller circuitry 802 can implement the fuel distribution pathway identifier circuitry 804 to determine which fuel distribution pathway is most appropriate for a given system based on the fuel levels.

The operational status identifier circuitry 807 identifies the aircraft 820 operational status. In some examples, the aircraft 820 can be in a stationary phase, a starting engine phase, a cruising phase, and/or a takeoff/climbing phase. Depending on the operational status of the aircraft 820, the fuel distribution pathway can be altered using the fuel distribution controller circuitry 802. For example, by identifying the available fuel distribution pathways using the fuel distribution pathway identifier circuitry 804, obtaining the fuel tank status and/or fill levels using the fuel tank identifier circuitry 806, and confirming the operational status of the aircraft 820 using the operational status identifier circuitry 807, the fuel distribution controller circuitry 802 determines the appropriate fuel distribution assemblies to utilize.

The sensor circuitry 808 uses sensor(s) positioned throughout the fuel distribution pathway(s) to determine data indicative of the fuel distribution assembly performance. For example, the sensor circuitry 808 can be in communication with one or more sensor(s) for sensing various operability parameters of the fuel distribution arrangement 300, 380, and/or 500 of FIGS. 3A, 3B, and/or 5. For example, the sensor circuitry 808 can receive data from the first sensor 302 configured to sense data indicative of the CNG tank bank 303, the second sensor 308 configured to sense data indicative of the CcH2 storage tank 250 (e.g., an internal temperature, an internal pressure, a temperature and/or pressure of gaseous fuel flowing from the fuel storage tank 250, etc.), the third sensor 309 configured to sense data indicative of a flow of compressed natural gas from the CNG tank bank 303 (e.g., a temperature, a pressure, and/or a flow rate of gaseous hydrogen fuel at a location upstream of the RA flow regulator 347, at a location downstream of the RA flow regulator 347, or both), the fourth sensor 344 configured to sense data indicative of a flow of hydrogen fuel through the compressor 342 (e.g., a temperature, a pressure, and/or a flow rate of hydrogen fuel at a location upstream of the compressor 342, at a location downstream of the compressor 342, or both), and the fifth sensor 356 configured sense data indicative of a hydrogen fuel within the buffer tank 345 (e.g., a pressure, a temperature, and/or a mass of hydrogen fuel within an internal cavity of the buffer tank 345). In some examples, the sensor circuitry 808 is in communication with a designated pressure sensor (e.g., pressure sensor 404) of FIG. 4A, 4B, and/or 4C to identify a pressure within the CcH2 storage tank 250.

The thermosiphon circuitry 810 controls the thermosiphoning loop 452 of FIGS. 4B and/or 5. In some examples, the thermosiphon circuitry 810 identifies the pressure in the CcH2 storage tank 250 via the pressure sensor 404. In some examples, the thermosiphon circuitry 810 identifies the temperature of the hydrogen in the CcH2 storage tank 250 using the second sensor 308 configured to sense data indicative of the CcH2 storage tank 250 (e.g., an internal temperature, an internal pressure, a temperature and/or pressure of gaseous fuel flowing from the fuel storage tank 250, etc.). In some examples, the thermosiphon circuitry 810 can be used to route the hydrogen gas via the thermosiphoning loop 452 for purposes of maintaining a constant pressure in the CcH2 storage tank 250 (e.g., in the cryo-vessel 252), as described in connection with FIG. 4B. For example, the thermosiphon circuitry 810 can engage the thermosiphoning loop 452 via the automatic valve 454, which permits hydrogen gas with a higher density to exit from the bottom of the CcH2 storage tank 250 and pass through the heat exchanger 456, which can be used to heat the passing hydrogen gas using heat from exhaust gases and/or other available heat sources. The heated hydrogen gas can return to the cryo-vessel 252 of the CcH2 storage tank 250 given that the heated hydrogen will become less dense and rise upwards to enter back to the CcH2 storage tank 250 through an opening located towards the upper portion of the cryo-vessel 252. In some examples, the thermosiphon circuitry 810 monitors the ambient temperature to determine whether the thermosiphoning loop 452 can continue to be used for purposes of maintaining a constant pressure in the CcH2 storage tank 250.

The heater circuitry 812 maintains a constant pressure in the CcH2 storage tank 250 using the heater 406 powered by an electric power source 402. In some examples, the heater circuitry 812 identifies the temperature of the hydrogen in the CcH2 storage tank 250 using the second sensor 308 configured to sense data indicative of the CcH2 storage tank 250 (e.g., an internal temperature, an internal pressure, a temperature and/or pressure of gaseous fuel flowing from the fuel storage tank 250, etc.). In some examples, the heater circuitry 812 identifies the pressure inside the CcH2 storage tank 250 using the dedicated pressure sensor 404. The heater circuitry 812 can engage the heater 406 to accelerate the process of heating the hydrogen gas, which can take longer using the thermosiphoning loop 452. In some examples, the heater circuitry 812 can be used to initiate the heater 406 when the ambient temperature is no longer adequate for maintaining a constant pressure in the CcH2 storage tank 250.

The compressor circuitry 814 determines whether to engage the compressor 342 for compression of the hydrogen gas passing through the CcH2 delivery assembly 320. In some examples, the compressor circuitry 814 monitors the fourth sensor 344 configured to sense data indicative of a flow of hydrogen fuel through the compressor 342 (e.g., a temperature, a pressure, and/or a flow rate of hydrogen fuel at a location upstream of the compressor 342, at a location downstream of the compressor 342, or both). In some examples, the compressor circuitry 814 engages the compressor 342 to further compress the hydrogen when the compressor circuitry 814 determines that the pressure in the cryo-vessel 252 has dropped below the pressure required for the combustor 354. In some examples, the compressor 342 can be used to compress the gaseous hydrogen to increase gas pressure prior to the fuel flow entering the regulator assembly 358.

The data storage 816 can be used to store any information associated with the fuel distribution pathway identifier circuitry 804, fuel tank identifier circuitry 806, sensor circuitry 808, thermosiphon circuitry 810, heater circuitry 812, and/or compressor circuitry 814. The example data storage 816 of the illustrated example of FIG. 8 can be implemented by any memory, storage device and/or storage disc for storing data such as flash memory, magnetic media, optical media, etc. Furthermore, the data stored in the example data storage 816 can be in any data format such as binary data, comma delimited data, tab delimited data, structured query language (SQL) structures, image data, etc.

While an example manner of implementing the fuel distribution controller circuitry 802 is illustrated in FIG. 8, one or more of the elements, processes, and/or devices illustrated in FIG. 8 may be combined, divided, re-arranged, omitted, eliminated, and/or implemented in any other way. Further, the example fuel distribution pathway identifier circuitry 804, the fuel tank identifier circuitry 806, operational status identifier circuitry 807, the sensor circuitry 808, the thermosiphon circuitry 810, the heater circuitry 812, the compressor circuitry 814, and/or, more generally, the example fuel distribution controller circuitry 802 of FIG. 8, may be implemented by hardware, software, firmware, and/or any combination of hardware, software, and/or firmware. Thus, for example, any of the fuel distribution pathway identifier circuitry 804, the fuel tank identifier circuitry 806, operational status identifier circuitry 807, the sensor circuitry 808, the thermosiphon circuitry 810, the heater circuitry 812, the compressor circuitry 814, and/or, more generally, the example fuel distribution controller circuitry 802 of FIG. 8 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the fuel distribution pathway identifier circuitry 804, the fuel tank identifier circuitry 806, operational status identifier circuitry 807, the sensor circuitry 808, the thermosiphon circuitry 810, the heater circuitry 812, the compressor circuitry 814, and/or, more generally, the example fuel distribution controller circuitry 802 of FIG. 8 is/are hereby expressly defined to include a non-transitory computer readable storage device or storage disk such as a memory, a digital versatile disk (DVD), a compact disk (CD), a Blu-ray disk, etc., including the software and/or firmware. Further still, the example fuel distribution controller circuitry 802 of FIG. 8 may include one or more elements, processes, and/or devices in addition to, or instead of, those illustrated in FIG. 8, and/or may include more than one of any or all of the illustrated elements, processes and devices.

Figure 9:
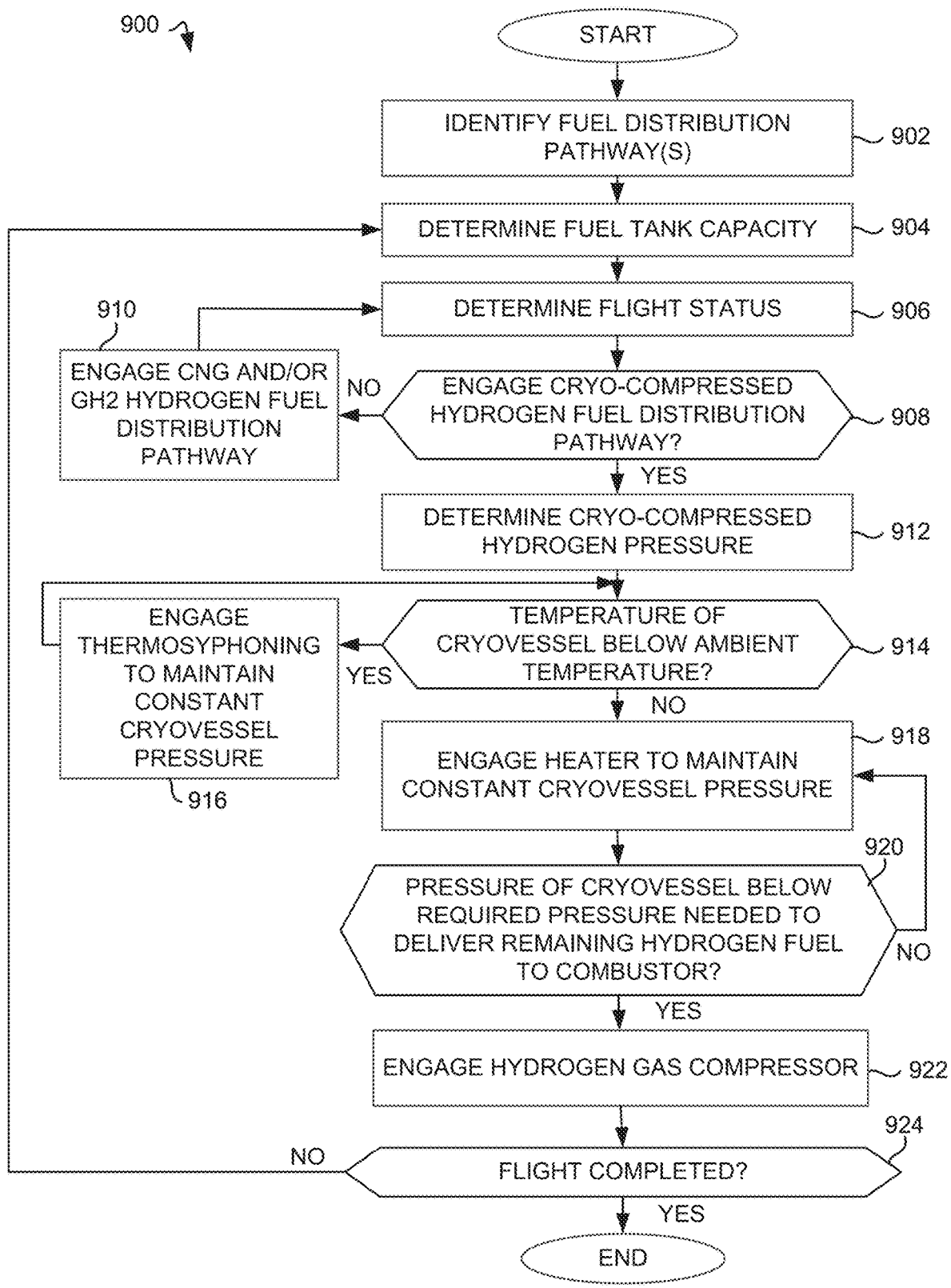
FIG. 9 is a flowchart representative of example machine readable instructions that may be executed by example processor circuitry to implement the fuel distribution controller circuitry of FIG. 8.

A flowchart representative of example hardware logic circuitry, machine readable instructions, hardware implemented state machines, and/or any combination thereof for implementing the fuel distribution controller circuitry 802 of FIG. 8 is shown in FIG. 9. The machine readable instructions may be one or more executable programs or portion(s) of an executable program for execution by processor circuitry, such as the processor circuitry 1012 shown in the example processor platform 1000 discussed below in connection with FIG. 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the fuel distribution controller circuitry 802 of FIG. 8 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

FIG. 9 is a flowchart representative of example machine readable instructions 900 that may be executed by example processor circuitry 1012 to implement the fuel distribution controller circuitry of FIG. 8. In the example of FIG. 9, the fuel distribution pathway identifier circuitry 804 identifies available fuel distribution pathway(s) on aircraft 820 of FIG. 8 (block 902). For example, the fuel distribution pathway identifier circuitry 804 determines the type(s) of fuel distribution assemblies present on the aircraft 820 (e.g., compressed natural gas distribution assembly, gaseous hydrogen distribution assembly, CcH2 distribution assembly, etc.). As described in connection with FIGS. 3A, 3B, 4A, 4B, and/or 5, fuel can be routed to the combustor from multiple sources (e.g., CNG tank bank, CcH2 tank, GH2 tank bank, etc.). In some examples, the fuel tank identifier circuitry 806 identifies the available fuel tank(s) on the aircraft 820 and determines the fuel level(s) in the available fuel tanks (e.g., CNG, CcH2, GH2 fuel levels) (block 904). In some examples, the operational status identifier circuitry 807 identifies aircraft 820 operational status (e.g., takeoff, cruising, etc.) (block 906).

Based on the operational status of the aircraft 820, the fuel tank level(s), and/or the available fuel distribution pathway(s), the fuel distribution controller circuitry 802 identifies the most appropriate fuel distribution pathway. For example, if the operational status identifier circuitry 807 determines that the aircraft 820 is in the initial stages of starting the engine 355 (e.g., take-off), the CcH2 distribution pathway may not be engaged until after take-off is completed (e.g., to allow for the heat exchanger 456 to maintain a constant pressure in the CcH2 storage tank 250).

In some examples, the determination by the fuel distribution controller circuitry 802 to engage the cryo-compressed hydrogen fuel distribution pathway (block 908) can depend on which fuel distribution pathway is most efficient at a given point in the aircraft's operational status. If the fuel distribution controller circuitry 802 determines that the CNG and/or GH2 hydrogen fuel distribution pathway should be activated (block 910), control returns to the operational status identifier circuitry 807 to update the operational status of the aircraft 820 over time, until a determination is made to activate the CcH2 distribution pathway (e.g., CcH2 delivery assembly 320).

Once the CcH2 distribution pathway is engaged using the fuel distribution controller circuitry 802 (block 908), the sensor circuitry 808 determines the cryo-compressed hydrogen (CcH2) pressure inside the CcH2 storage tank 250 (block 912). In some examples, the sensor circuitry 808 determines the pressure using the pressure sensor 404. To adjust the pressure, the fuel distribution controller circuitry 802 identifies whether to engage the thermosiphon circuitry 810, the heater circuitry 812, and/or the compressor circuitry 814. For example, the internal pressure of the CcH2 storage tank 250 can be maintained by heating the hydrogen gas. In some examples, the adjustments to the temperature can be determined using the hydrogen density versus temperature data 700, 750 of FIG. 7A, 7B. If the temperature of the cryo-vessel 252 of the CcH2 storage tank 250 is below an ambient temperature (block 914), the thermosiphon circuitry 810 can be used to maintain constant pressure in the CcH2 storage tank 250 (block 916). For example, the thermosiphoning circuitry 810 can engage the automatic valve 454 and/or the heat exchanger 456 to allow hydrogen gas to exit the cryo-vessel 252 and enter the thermosiphoning loop 452, as described in connection with FIG. 4B.

While the temperature of the hydrogen remains below the ambient temperature, the hydrogen can be heated without a dedicated heating power source (e.g., without using a heater), allowing the warmed hydrogen gas to return to the cryo-vessel 252 via the thermosiphoning loop 452. Once the ambient temperature (e.g., −40 degrees Celsius) is surpassed, the heater circuitry 812 can be used to initiate an electric power source 402 that allows for a dedicated heater 406 to maintain pressure in the CcH2 storage tank 250 (block 918), as described in connection with FIG. 4A. In some examples, the thermosiphoning loop 452 and/or the heater 406 can be engaged in combination to accelerate the pressure change in the CcH2 storage tank 250. In some examples, the sensor circuitry 808 determines that the pressure of the cryo-vessel 252 is below the required pressure needed to deliver any remaining hydrogen fuel from the CcH2 storage tank 250 to the combustor 354 (block 920).

As such, the compressor circuitry 814 uses the compressor 342 to compress the hydrogen gas flow traveling towards the regulator assembly 358 (block 922). For example, the compressor circuitry 814 can determine whether to engage the compressor 342 based on a pressure reading acquired from the fourth sensor 344 configured to sense data indicative of a flow of hydrogen fuel through the compressor 342. During the duration of the flight, the fuel distribution controller circuitry 802 determines whether to adjust the delivery assembly used to deliver hydrogen fuel to the combustor 354. For example, if the flight is not completed (block 924), the fuel tank identifier circuitry 806 continues to identify the fuel tank capacity (block 904) and/or the flight status (block 906) to determine whether to engage the CcH2 delivery assembly 320, the GH2 delivery assembly 501, and/or the CNG delivery assembly 301.

Figure 10:
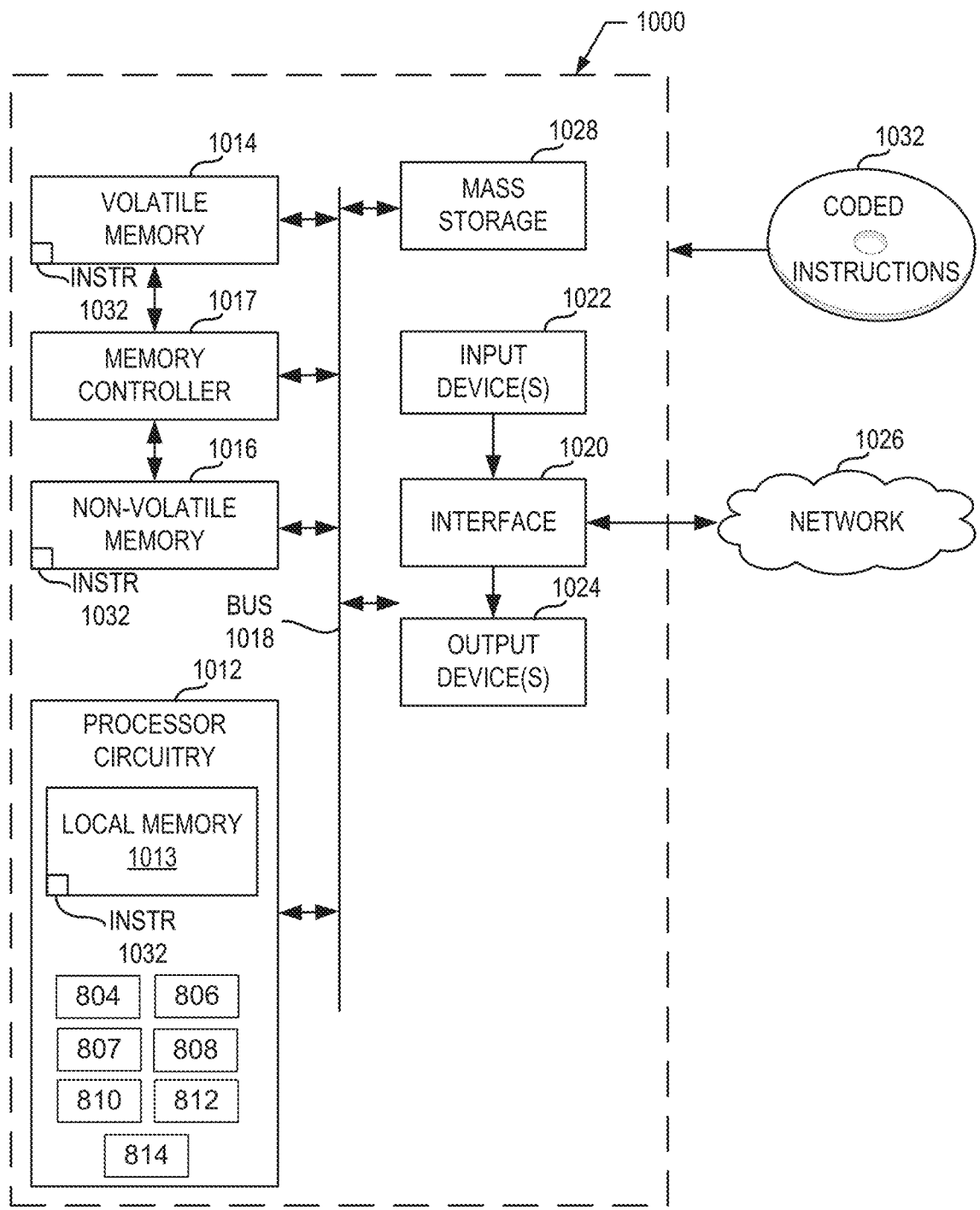
FIG. 10 is a block diagram of an example processing platform including processor circuitry structured to execute the example machine readable instructions of FIG. 9 to implement the fuel distribution controller circuitry of FIG. 8.

FIG. 10 is a block diagram of an example processor platform 1000 including processor circuitry structured to execute the example machine readable instructions of FIG. 9 to implement the fuel distribution controller circuitry of FIG. 8. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the fuel distribution pathway identifier circuitry 804, the fuel tank identifier circuitry 806, operational status identifier circuitry 807, the sensor circuitry 808, the thermosiphon circuitry 810, the heater circuitry 812, and/or the compressor circuitry 814.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIG. 9, may be stored in the mass storage device 1028, in the volatile memory 1014, in the non-volatile memory 1016, and/or on a removable non-transitory computer readable storage medium such as a CD or DVD. From the foregoing, it will be appreciated that example systems, methods, apparatus, and articles of manufacture have been disclosed that incorporate cryo-compressed hydrogen (CcH2), compressed natural gas (CNG), and/or gaseous hydrogen (GH2) storage. In some examples disclosed herein, cryo-compressed hydrogen (CcH2) can be used in place of liquid hydrogen (LH2) fuel (e.g., CcH2 can have similar density as the LH2). As described herein, the cryo-compressed hydrogen (CcH2) can be stored in cryogenic temperatures in the range of 40-70 Kelvin. For example, a dual wall cryostat (e.g., including a cryo-vessel and/or a vacuum vessel) can be used to store the CcH2. In some examples, the cryo-vessel used for CcH2 storage can be a type-3 vessel including an aluminum liner and/or a composite overwrap. By storing hydrogen gas in cryo-compressed conditions as described herein, the fuel distribution system can be significantly simplified. Furthermore, pressure in the CcH2 tank can be maintained at a constant value during an aircraft's operation by thermosiphoning and/or using a heater.

Further aspects of the present disclosure are provided by the subject matter of the following clauses:

Example 1 includes a fuel distribution system, comprising a vacuum vessel, and a cryogenic vessel positioned within the vacuum vessel, the cryogenic vessel holding cryo-compressed hydrogen fuel in a gaseous phase as part of a cryo-compressed hydrogen delivery assembly, the cryo-compressed hydrogen delivery assembly including at least one of a heater or a thermosiphoning loop to maintain a pressure of the cryogenic vessel.

Example 2 includes the fuel distribution system of any preceding clause, further including a compressed natural gas tank for holding compressed natural gas as part of a compressed natural gas delivery assembly, where in the compressed natural gas delivery assembly extends in a parallel arrangement with the cryo-compressed hydrogen delivery assembly.

Example 3 includes the fuel distribution system of any preceding clause, further including a regulator assembly in fluid communication with the cryo-compressed hydrogen delivery assembly and the compressed natural gas delivery assembly.

Example 4 includes the fuel distribution system of any preceding clause, wherein the thermosiphoning loop includes a heat exchanger and an automatic valve to regulate cryo-compressed hydrogen fuel flow into and out of the cryogenic vessel.

Example 5 includes the fuel distribution system of any preceding clause, wherein the cryogenic vessel is a type-three vessel including an aluminum liner and a composite overwrap.

Example 6 includes the fuel distribution system of any preceding clause, wherein a wall thickness of the cryogenic vessel is determined based on a pressure rating associated with a cryo-compressed hydrogen fuel tank used to store the cryo-compressed hydrogen fuel.

Example 7 includes the fuel distribution system of any preceding clause, wherein the cryo-compressed hydrogen delivery assembly includes a compressor to compress hydrogen fuel originating from the cryo-compressed hydrogen fuel tank, the compressor located upstream from a combustor.

Example 8 includes a fuel distribution system, comprising a compressed natural gas tank for holding a first portion of fuel as part of a compressed natural gas delivery assembly, and a cryo-compressed hydrogen tank for holding a second portion of fuel as part of a cryo-compressed hydrogen delivery assembly, the cryo-compressed hydrogen delivery assembly including a thermosiphoning loop to maintain a pressure of the cryo-compressed hydrogen tank.

Example 9 includes the fuel distribution system of any preceding clause, further including a gaseous hydrogen fuel tank for holding a third portion of hydrogen fuel in a gaseous phase as part of a gaseous hydrogen delivery assembly.

Example 10 includes the fuel distribution system of any preceding clause, wherein the gaseous hydrogen delivery assembly and the compressed natural gas delivery assembly extend in a parallel arrangement with the cryo-compressed hydrogen delivery assembly.

Example 11 includes the fuel distribution system of any preceding clause, wherein the thermosiphoning loop routes a portion of cryo-compressed hydrogen gas from a lower portion of the cryo-compressed hydrogen tank via a heat exchanger.

Example 12 includes the fuel distribution system of any preceding clause, wherein the thermosiphoning loop routes cryo-compressed hydrogen gas exiting the heat to an upper portion of the cryo-compressed hydrogen tank.

Example 13 includes an apparatus for controlling fuel distribution in a vehicle, the apparatus comprising at least one memory, instructions in the apparatus, and processor circuitry to execute the instructions to identify a fuel distribution pathway, the fuel distribution pathway including a cryo-compressed hydrogen tank, identify an internal pressure of the cryo-compressed hydrogen tank, adjust the internal pressure of the cryo-compressed hydrogen tank using at least one of a thermosiphoning loop or a heater, and route cryo-compressed hydrogen fuel from the cryo-compressed hydrogen tank to a combustor.

Example 14 includes the apparatus of any preceding clause, wherein the thermosiphoning loop includes a heat exchanger and an automatic valve to regulate cryo-compressed hydrogen fuel flow into and out of a cryogenic vessel of the cryo-compressed hydrogen tank.

Example 15 includes the apparatus of any preceding clause, wherein the process circuitry is to determine an operational status of the vehicle, the operational status used to select a fuel distribution pathway, the fuel distribution pathway further including a compressed natural gas delivery assembly.

Example 16 includes the apparatus of any preceding clause, wherein the operational status relates to an operational status of an aircraft, the operational status including a cruising phase, a takeoff phase, or an engine start-up phase.

Example 17 includes the apparatus of any preceding clause, wherein the processor circuitry is to engage the compressed natural gas delivery assembly when the operational status is an engine start-up phase.

Example 18 includes the apparatus of any preceding clause, wherein the processor circuitry is to compress the cryo-compressed hydrogen fuel using a compressor positioned upstream of the combustor.

Example 19 includes the apparatus of any preceding clause, wherein the processor circuitry is to compress the cryo-compressed hydrogen fuel using the compressor when the internal pressure of the cryo-compressed hydrogen fuel is below a pressure for combustor usage.

Example 20 includes the apparatus of any preceding clause, wherein the processor circuitry is to maintain a constant pressure in a cryo-vessel of the cryo-compressed hydrogen tank, the cryo-vessel a type-three vessel including an aluminum liner and a composite overwrap.

Example 21 includes a method for controlling fuel distribution in a vehicle, the method including identifying an internal pressure of a cryo-compressed hydrogen tank, adjusting the internal pressure of the cryo-compressed hydrogen tank using at least one of a thermosiphoning loop or a heater, and routing cryo-compressed hydrogen fuel from the cryo-compressed hydrogen tank to a combustor.

Example 22 includes the method of any preceding clause, wherein the thermosiphoning loop includes a heat exchanger and an automatic valve to regulate cryo-compressed hydrogen fuel flow into and out of a cryogenic vessel of the cryo-compressed hydrogen tank.

Example 23 includes the method of any preceding clause, further including determining an operational status of the vehicle, the operational status used to select the fuel distribution pathway, the fuel distribution pathway further including a compressed natural gas delivery assembly.

Example 24 includes the method of any preceding clause, wherein, when the operational status of the vehicle relates to an operational status of an aircraft, the operational status includes a cruising phase, a takeoff phase, or an engine start-up phase.

Example 25 includes the method of any preceding clause, further including engaging the compressed natural gas delivery assembly when the operational status is the engine start-up phase.

Example 26 includes the method of any preceding clause, further including compressing cryo-compressed hydrogen fuel using a compressor positioned upstream of the combustor.

Example 27 includes the method of any preceding clause, further including compressing the cryo-compressed hydrogen fuel using the compressor when the internal pressure of the cryo-compressed hydrogen fuel is below a pressure for combustor usage.

Example 28 includes the method of any preceding clause, further including maintaining a constant pressure in a cryo-vessel of the cryo-compressed hydrogen tank, the cryo-vessel a type-three vessel including an aluminum liner and a composite overwrap.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A fuel distribution system, comprising:
   a vacuum vessel;
   a cryogenic vessel positioned within the vacuum vessel, the cryogenic vessel part of a cryo-compressed hydrogen delivery assembly;
   a compressed natural gas tank; and
   at least one of a heater or a thermosiphoning loop to maintain a pressure of the cryogenic vessel.

2. The fuel distribution system of claim 1, wherein the compressed natural gas tank is part of a compressed natural gas delivery assembly, the compressed natural gas delivery assembly extending in a parallel arrangement with the cryo-compressed hydrogen delivery assembly.

3. The fuel distribution system of claim 2, further including a regulator assembly in fluid communication with the cryo-compressed hydrogen delivery assembly and the compressed natural gas delivery assembly.

4. The fuel distribution system of claim 1, wherein the thermosiphoning loop includes a heat exchanger and an automatic valve to regulate cryo-compressed hydrogen fuel flow into and out of the cryogenic vessel.

5. The fuel distribution system of claim 1, wherein the cryogenic vessel is a type-three vessel including an aluminum liner and a composite overwrap.

6. The fuel distribution system of claim 1, wherein a wall thickness of the cryogenic vessel is determined based on a pressure rating associated with a cryo-compressed hydrogen fuel tank used to store the cryo-compressed hydrogen fuel.

7. A fuel distribution system, comprising:
   a compressed natural gas tank for holding a first portion of fuel as part of a compressed natural gas delivery assembly; and
   a cryo-compressed hydrogen tank for holding a second portion of fuel as part of a cryo-compressed hydrogen delivery assembly, the cryo-compressed hydrogen delivery assembly including a thermosiphoning loop to maintain a pressure of the cryo-compressed hydrogen tank.

8. The fuel distribution system of claim 7, further including a gaseous hydrogen fuel tank for holding a third portion of hydrogen fuel in a gaseous phase as part of a gaseous hydrogen delivery assembly.

9. The fuel distribution system of claim 8, wherein the gaseous hydrogen delivery assembly and the compressed natural gas delivery assembly extend in a parallel arrangement with the cryo-compressed hydrogen delivery assembly.

10. The fuel distribution system of claim 7, wherein the cryo-compressed hydrogen tank includes a lower portion, the lower portion connected to the thermosiphoning loop to route a portion of cryo-compressed hydrogen gas via a heat exchanger.

11. The fuel distribution system of claim 10, wherein the cryo-compressed hydrogen tank includes an upper portion, the upper portion connected to the thermosiphoning loop to receive cryo-compressed hydrogen gas exiting the heat exchanger.

12. An apparatus for controlling fuel distribution in a vehicle, the apparatus comprising:
   at least one memory;
   instructions in the apparatus, the instructions stored on the memory; and
   processor circuitry to execute the instructions to:
      identify an internal pressure of a cryo-compressed hydrogen tank;
      adjust the internal pressure of the cryo-compressed hydrogen tank using at least one of a thermosiphoning loop or a heater; and
      route cryo-compressed hydrogen fuel from the cryo-compressed hydrogen tank to a combustor.

13. The apparatus of claim 12, wherein the thermosiphoning loop includes a heat exchanger and an automatic valve to regulate cryo-compressed hydrogen fuel flow into and out of a cryogenic vessel of the cryo-compressed hydrogen tank.

14. The apparatus of claim 12, wherein the processor circuitry is to determine an operational status of the vehicle, the operational status used to select the fuel distribution pathway, the fuel distribution pathway further including a compressed natural gas delivery assembly.

15. The apparatus of claim 14, wherein, when the operational status of the vehicle relates to an operational status of an aircraft, the operational status includes a cruising phase, a takeoff phase, or an engine start-up phase.

16. The apparatus of claim 15, wherein the processor circuitry is to engage the compressed natural gas delivery assembly when the operational status is the engine start-up phase.

17. The apparatus of claim 12, wherein the processor circuitry is to compress cryo-compressed hydrogen fuel using a compressor positioned upstream of the combustor.

18. The apparatus of claim 17, wherein the processor circuitry is to compress the cryo-compressed hydrogen fuel using the compressor when the internal pressure of the cryo-compressed hydrogen fuel is below a pressure for combustor usage.

19. The apparatus of claim 12, wherein the processor circuitry is to maintain a constant pressure in a cryo-vessel of the cryo-compressed hydrogen tank, the cryo-vessel a type-three vessel including an aluminum liner and a composite overwrap.

* * * * *